(12) United States Patent
Wu et al.

(10) Patent No.: US 12,501,016 B2
(45) Date of Patent: Dec. 16, 2025

(54) IMAGING APPARATUS AND METHOD, AND DEVICE

(71) Applicant: HUAIBEI KANGHUI ELECTRONIC TECHNOLOGY CO., LTD., Anhui (CN)

(72) Inventors: Benhua Wu, Anhui (CN); Jianfei Wu, Anhui (CN)

(73) Assignee: HUAIBEI KANGHUI ELECTRONIC TECHNOLOGY CO., LTD., Huaibei (CN)

( * ) Notice: Subject to any disclaimer, the term of this patent is extended or adjusted under 35 U.S.C. 154(b) by 18 days.

(21) Appl. No.: 18/293,699

(22) PCT Filed: Aug. 25, 2022

(86) PCT No.: PCT/CN2022/114901
§ 371 (c)(1),
(2) Date: Jan. 30, 2024

(87) PCT Pub. No.: WO2023/035965
PCT Pub. Date: Mar. 16, 2023

(65) Prior Publication Data
US 2024/0348766 A1      Oct. 17, 2024

(30) Foreign Application Priority Data

Sep. 13, 2021 (CN) .......................... 202111066693.0
Sep. 13, 2021 (CN) .......................... 202111066699.8
(Continued)

(51) Int. Cl.
H04N 13/254      (2018.01)
G02B 5/18         (2006.01)
(Continued)

(52) U.S. Cl.
CPC ......... *H04N 13/254* (2018.05); *G02B 5/1876* (2013.01); *H04N 13/243* (2018.05); *H04N 13/293* (2018.05)

(58) Field of Classification Search
CPC ........... H04N 1/00132; H04N 1/00143; H04N 1/00161; H04N 1/00175; H04N 1/00188;
(Continued)

(56) References Cited

U.S. PATENT DOCUMENTS

2012/0293632 A1* 11/2012 Yukich ................... H04N 23/90
                                                                    348/47
2014/0253677 A1*  9/2014 Chen ...................... H04N 23/54
                                                                    348/36
(Continued)

FOREIGN PATENT DOCUMENTS

CN        215417490 U      1/2022
CN        215449878 U      1/2022
(Continued)

*Primary Examiner* — Behrooz M Senfi

(57) ABSTRACT

Disclosed are an imaging apparatus and method, and a device. The imaging apparatus includes an imaging element with an imaging surface of a spherical structure, where angles between all parts of the spherical imaging surface and light emitted by an image source at an intersection of the imaging surface are 90°, and a plurality of imaging units are regularly arranged on the imaging surface. The imaging element is used to completely, intactly and accurately obtain a scene image, and the obtained image is displayed by using the display device whose display surface has the same structure as and is corresponding to a reverse spherical display surface, such that a highly vivid three-dimensional picture completely consistent with a scene is presented, thereby overcoming the defect that the highly vivid three-dimensional scene picture is difficult to obtain and present by a flat projection surface based imaging method.

15 Claims, 19 Drawing Sheets

(30) Foreign Application Priority Data

| | | |
|---|---|---|
| Sep. 13, 2021 | (CN) | 202111068298.6 |
| Sep. 13, 2021 | (CN) | 202122200821.8 |
| Sep. 13, 2021 | (CN) | 202122200889.6 |
| Sep. 13, 2021 | (CN) | 202122207067.0 |
| Sep. 13, 2021 | (CN) | 202122207069.X |
| Sep. 13, 2021 | (CN) | 202122207099.0 |

(51) Int. Cl.
*H04N 13/243* (2018.01)
*H04N 13/293* (2018.01)

(58) Field of Classification Search
CPC ......... H04N 1/00339; H04N 1/00411; H04N 13/243; H04N 13/254; H04N 13/293; H04N 9/3141; G02B 13/06; G02B 3/08; G02B 5/1876
USPC .......................................... 348/46
See application file for complete search history.

(56) References Cited

U.S. PATENT DOCUMENTS

| | | | | |
|---|---|---|---|---|
| 2018/0317339 A1* | 11/2018 | Evans, V | ........... | H05K 7/20127 |
| 2019/0052785 A1* | 2/2019 | Ai | ........... | H04N 23/58 |

FOREIGN PATENT DOCUMENTS

| | | | | |
|---|---|---|---|---|
| CN | 215499282 U | 1/2022 | | |
| CN | 215818329 U | 2/2022 | | |
| JP | 2000076674 A | * 3/2000 | ............ | G11B 7/09 |
| JP | 2012186625 A | * 9/2012 | ............ | H04N 5/222 |

\* cited by examiner

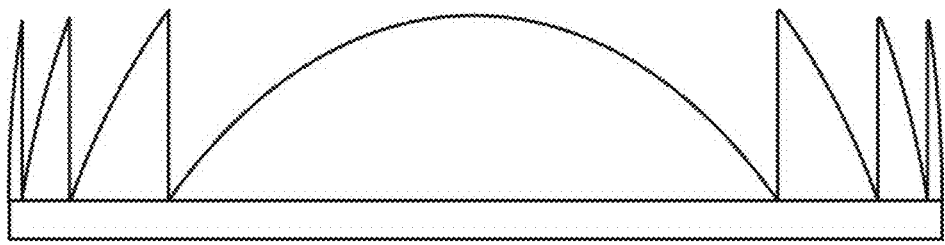
FIG. 13
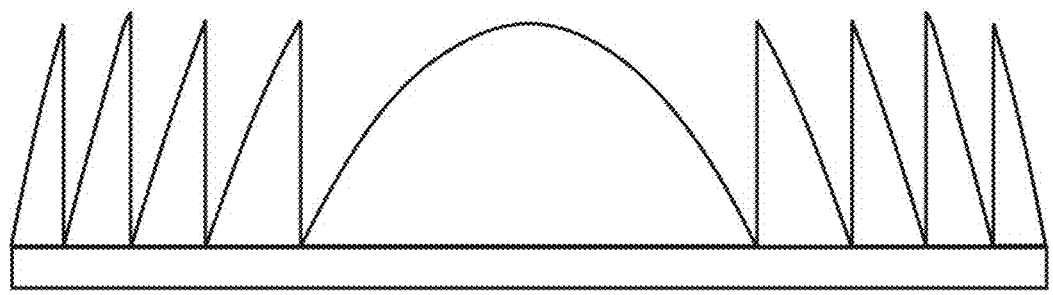
FIG. 14
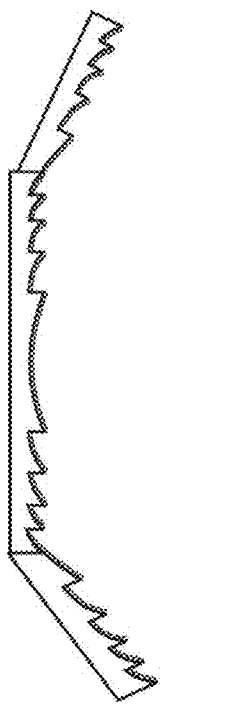 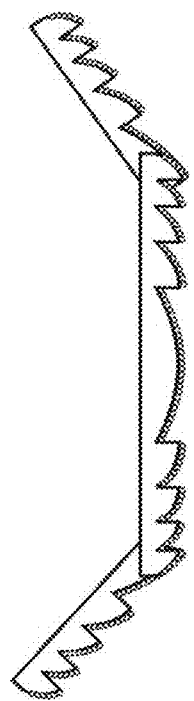  
FIG. 15  FIG. 16  FIG. 17  FIG. 18

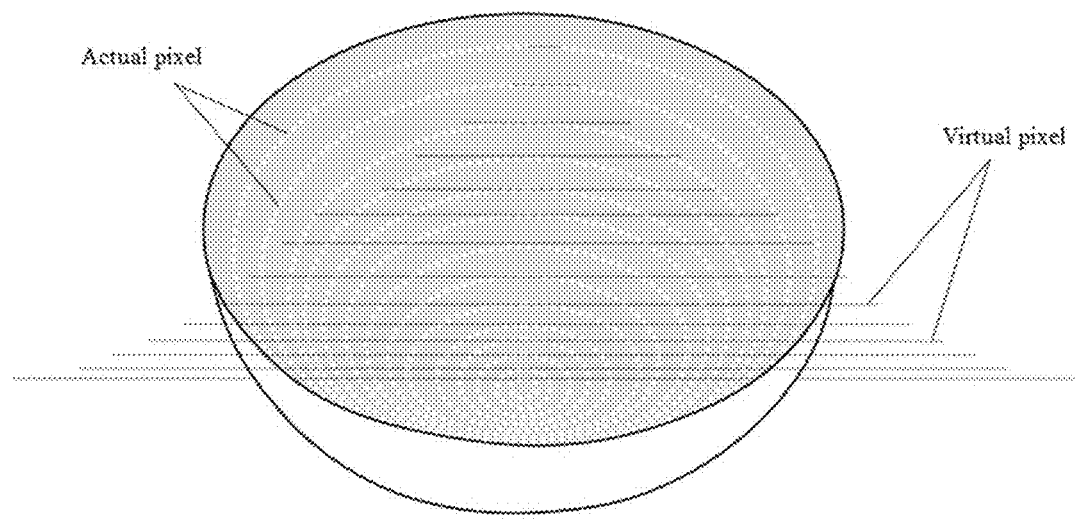
FIG. 24
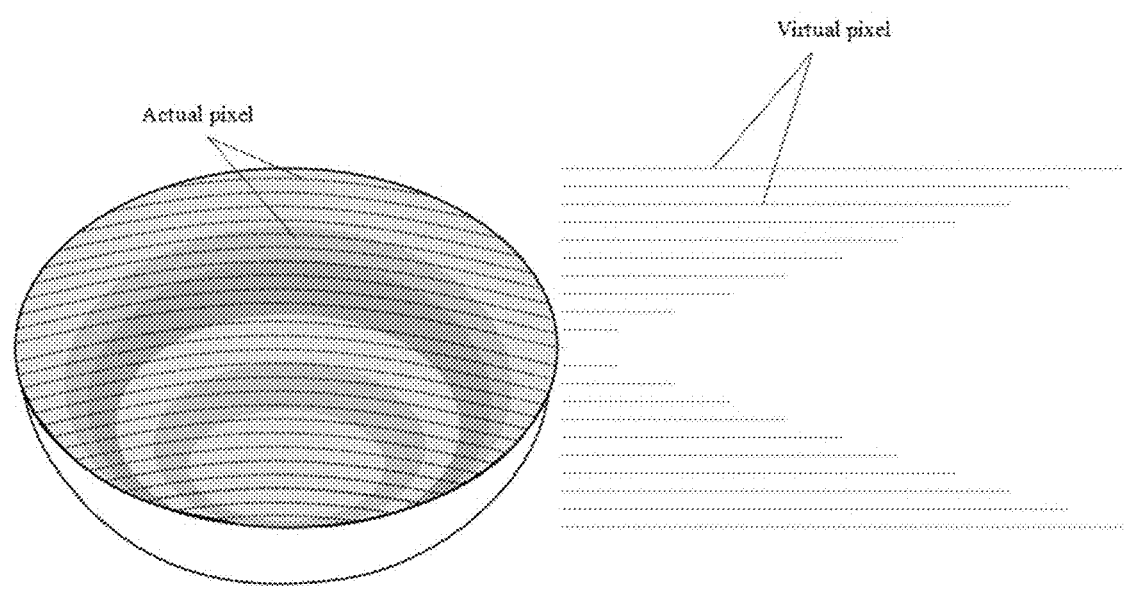
FIG. 25
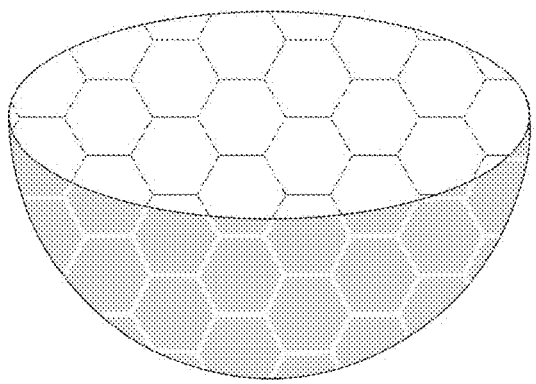 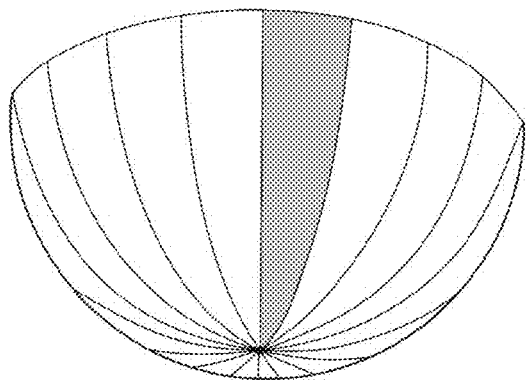
FIG. 26          FIG. 27

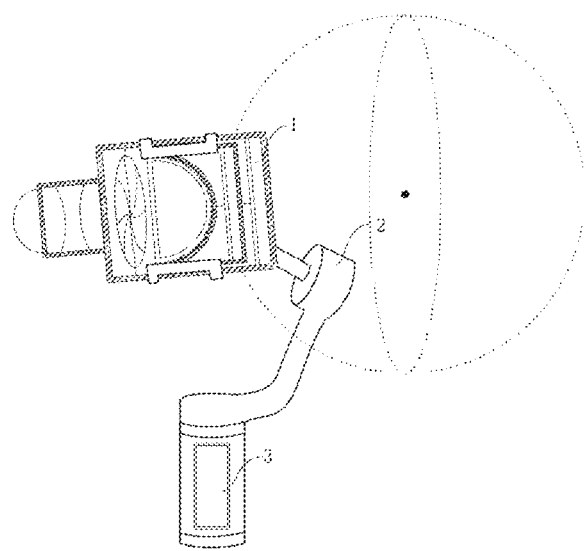
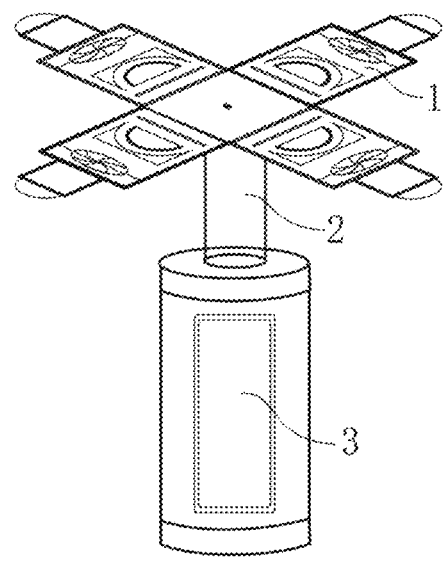
FIG. 38　　　　　　　　FIG. 39
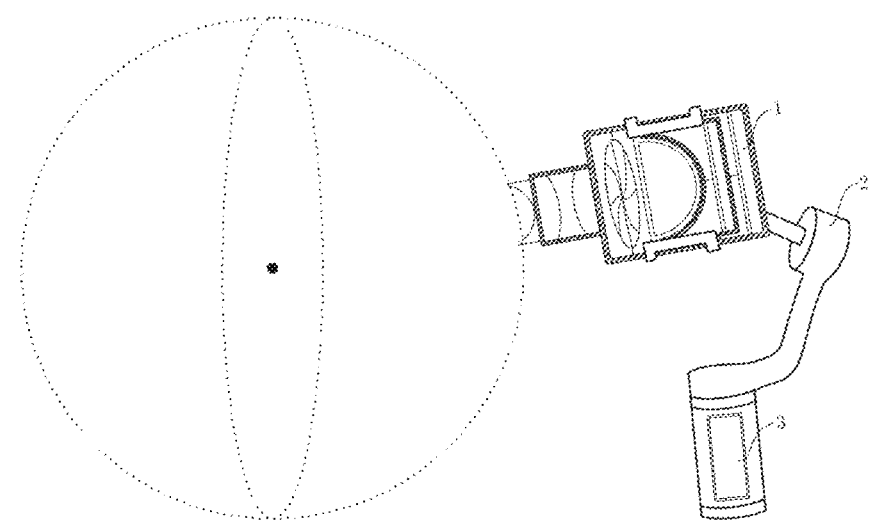
FIG. 40
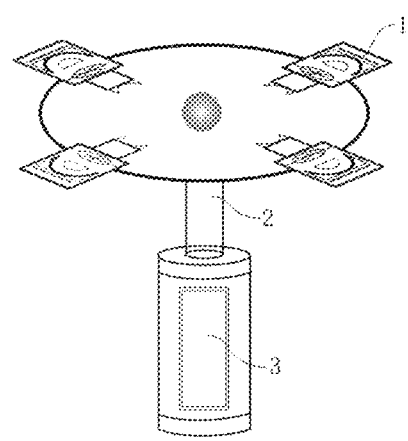
FIG. 41

IMAGING APPARATUS AND METHOD, AND DEVICE

CROSS REFERENCE TO RELATED APPLICATIONS

This application is a U.S. National Stage of International Application No. PCT/CN2022/114901 filed on Aug. 25, 2022, for which priority is claimed under 35 U.S.C. § 120; and this application claims priority of Application No. CN 202111066699.8, CN 202111068298.6, CN 202122200821.8, CN 202122207069.X, CN 202111066693.0, CN 202122207067.0, CN 202122200889.6, and CN 202122207099.0, all filed in China on Sep. 13, 2021 under 35 U.S.C. § 119, the entire contents of all of which are hereby incorporated by reference.

FIELD OF TECHNOLOGY

The present disclosure relates to the field of imaging technologies, specifically to an imaging apparatus and method, and a device.

BACKGROUND

At present, imaging methods used by people are all based on the deduction and extension of a flat projection surface. The conventional panoramic image is a wide area source or local area source panoramic image file formed by spherizing and stitching a plurality of planar images shot and outputted by using one or more cameras with planar image sensors. During the process, there are the phenomena of picture deformation, blurring, stretching, collapse, damage, and the like, and there are still the defects of picture dislocation, rigid and unnatural color transition, and the like when the images are spliced into a spherical panoramic image.

3D modeling is to project an object to flat projection surfaces in directions X, Y, and Z separately for calculation of various corresponding numerical values. Although tangential and radial deformations are considered in the projection process, the loss of photons is not considered in depth. Shooting with a camera with a flat photosensitive surface is a real shooting behavior, and varying degrees of photon losses of light reaching different parts of the flat photosensitive surface are highlighted. In a linear imaging model, when a part of a projection surface is farther away from a central point of the projection surface, the loss of photons after arrival is greater until all the photons are lost, and a picture becomes more and more blurred until there is no picture at all. In a nonlinear imaging model, when a part of a projection surface is farther away from a central point of the projection surface, light reaches the projection surface in the form of collapse, so the light receiving area of the projection surface becomes smaller and smaller until it is zero. When a formed image is displayed and restored to a non-collapsed picture, the more serious the collapse is, the more blurred the picture is, until it is not clear at all. This phenomenon is a fatal defect that always exists and cannot be eliminated in a flat projection surface based imaging method.

The flat projection surface based imaging method, whether it is a linear imaging model, a nonlinear imaging model, or a linear and nonlinear combined imaging model, has the phenomenon of deformation. Imaging in the linear imaging model is also accompanied with blurring, and deformation is very serious in some cases or at some parts. Most of existing solutions are to alleviate the problem by changing the focal length, but it cannot be eliminated. At present, a standard lens and a telephoto lens of a cameras mostly use a linear imaging model. The telephoto lens mainly shoots a distant scene, and an angle variable (an angle between a point in a picture and a central axis) caused by change in a distance between two points of the distant scene on a longitudinal axis does not change much, so image deformation caused is not serious or significant. The standard lens shoots a medium-distance scene, and an angle variable caused by change in a distance between two points of the scene on the longitudinal axis becomes apparent in this case, so deformation also becomes obvious. No matter what kind of lens, for close-range shooting, an angle variable caused by a longitudinal distance difference will be very large, so a shot picture deforms severely. For wide-angle and fisheye lenses, an angle variable caused by a distance between two points of a scene on a longitudinal axis is very large, so the nonlinear model or the linear and nonlinear combined model has to be used to alleviate such phenomenon of serious deformation in the flat projection surface based imaging method, but such way not only cannot fundamentally eliminate the defect of deformation, but also will still bring about the defect in picture definition.

The flat projection surface based imaging method completely does not has the function of obtaining an image from a space scene on longitudinal coordinates parallel to or coincident with an imaging axis. For the space scene on the longitudinal coordinates of a rectangular coordinate system, the flat projection surface based imaging method cannot implement complete projection of continuous point, line, and surface, and can only implement approximate projection of a single point and a short line segment, so it is impossible to obtain a complete image of a three-dimensional space, which is also the reason why it cannot obtain an image with a really strong three-dimensional effect.

SUMMARY

To solve the existing problems, an objective of the present disclosure is to provide an imaging apparatus and method, and a device.

To achieve the above objective, the present disclosure adopts the following technical solution: an imaging apparatus is provided, including an imaging element with an imaging surface of a spherical structure, where angles between all parts of the spherical imaging surface and light emitted by an image source at an intersection of the imaging surface are 90°, and a plurality of imaging units are distributed on the imaging surface.

In some embodiments, the imaging apparatus further includes an image source of a spherical structure; during imaging, light emitted by the image source is irradiated onto the imaging surface of the imaging element, and the image source adjusts a direction and an angle of incident light, such that all the light finally irradiated onto the imaging surface is perpendicular to corresponding positions of all the parts of the imaging surface.

In some embodiments, a model in an imaging method further includes an optical lens combination and an auxiliary lens, where the optical lens combination and the auxiliary lens are located on a path of the light, a direction and the path of the light emitted by the image source are changed by changing attributes and layout of the optical lens combination, and a distance and a position of the light arriving at the imaging surface are changed correspondingly, such that the imaging surface is capable of being placed in a specified position as needed; and the auxiliary lens further precisely adjusts the incident light on the imaging surface, such that the incident light irradiated onto all the parts of the imaging surface is precisely perpendicular to the corresponding positions of all the parts of the imaging surface.

In some embodiments, the auxiliary lens coincides with a symmetric axis of the imaging surface, and the imaging surface, the image source, and the auxiliary lens have the same type of spherical structure or are matched with one another.

In some embodiments, the imaging surface and/or the image source and/or the auxiliary lens are/is of a structure with a flat surface and a spherical surface, or a structure with two spherical surfaces; and the spherical surface refers to a concave spherical surface or a convex spherical surface.

In some embodiments, the spherical structure of the imaging surface and/or the image source and/or the auxiliary lens is a conventional spherical structure, a Fresnel spherical structure, or a combined structure of a plurality of Fresnel spherical structures; the conventional spherical structure is one of a conventional regular spherical structure, a conventional ellipsoidal structure, and a conventional paraboloidal structure; and the Fresnel spherical structure is one of a Fresnel regular spherical structure, a Fresnel ellipsoidal structure, and a Fresnel paraboloidal structure.

In some embodiments, the imaging units on the imaging surface are arranged on the imaging surface in a manner of longitude lines, an angle between every two of the longitude lines is equal, and a spacing between every two of the imaging units on a same longitude line is equal; or the imaging units on the imaging surface are arranged on the imaging surface in a manner of latitude lines/transverse lines/spiral lines, a spacing between every two of the imaging units on a same latitude line/transverse line/spiral line is equal and is equal to a spacing between adjacent two of the latitude lines/transverse lines/spiral lines, and when there are a plurality of spiral lines on the imaging surface on which the imaging units are arranged in a manner of the spiral lines, a spacing between every two of the plurality of spiral lines is equal and is equal to the spacing between every two of the imaging units; the spacing herein refers to a spacing along the imaging surface; or the imaging units which do not use any point, line, or surface as a reference object are distributed on the imaging surface in an equally spaced manner; and the imaging units refer to photosensitive units on a photosensitive surface of a camera image sensor, display pixels of a display screen, or image pixels of an image.

The present disclosure further provides an imaging method based on any one of the above imaging apparatuses, including: S1: setting angles between all parts of a spherical imaging surface and light emitted by an image source at an intersection of the imaging surface to 90°; S2: performing matrixing on imaging units on the imaging surface to form a virtual row and column matrix, and performing image pixel value reading or writing on the virtual row and column matrix; and S3: directly receiving, by an image obtaining device for a convex spherical imaging surface, a virtual matrix formed by an external world scene, indirectly receiving, by a concave or convex spherical imaging surface, an image file corresponding to the virtual matrix and formed and outputted by the external world scene through a convex spherical image source, and performing restoration display by using a display device whose watching surface is a concave spherical display surface; and directly receiving, by a concave spherical imaging surface, the virtual matrix formed by the external world scene, indirectly receiving, by the concave or convex spherical imaging surface, the image file corresponding to the virtual matrix and formed and outputted by the external world scene through a concave spherical image source, and performing restoration display by using a display device whose watching surface is a convex spherical display surface.

In some embodiments, a method for reading the imaging units in S2 is as follows: S2.1: a method for supplementing actual imaging units on latitude lines/transverse lines with virtual imaging units, in which the imaging units distributed on the imaging surface in a manner of the latitude lines/transverse lines are used as the actual imaging units, a number of the actual imaging units on a longest latitude line/transverse line is used as a reference number, the imaging units whose number is less than the reference number on other latitude lines/transverse lines are supplemented with the virtual imaging units in order to make a sum of the actual imaging units and the supplemented virtual imaging units on other latitude lines/transverse lines reach the reference number, and the latitude line/transverse line for the same number of imaging units whose number reaches the reference number is used as a row; and the rows obtained by the above method are used as rows, and a number of the latitude lines/transverse lines for all the imaging units on the imaging surface is used as a number of columns, to form the virtual row and column matrix.

In some embodiments, S2.2: a method for mutually supplementing imaging units on adjacent latitude lines/transverse lines is used, in which the imaging units distributed on the imaging surface in a manner of the latitude lines/transverse lines are used as actual imaging units, a given number of the actual imaging units is used as a reference value, one of the latitude lines/transverse lines is used as a starting line, the actual imaging units are virtually picked line by line and point by point, if a number of the actual imaging units virtually picked from the starting latitude line/transverse line reaches the reference value, the starting latitude line/transverse line serves as a virtual row and recorded as a first row, or if the reference value is not reached, the imaging units continue being virtually picked from an adjacent next latitude line/transverse line, and the adjacent next latitude line/transverse line serves as a virtual row and recorded as a first row until the reference value is reached; virtual picking of the remaining actual imaging units from the latitude line/transverse line is included in virtual picking from a next virtual row; by analogy, until the actual imaging units on the last latitude line/transverse line of the imaging surface are all virtually picked, and when a number of the actual imaging units virtually picked at last time does not reach the reference value, virtual imaging units are used for supplementation; and finally, the rows obtained by the above method are used as rows, and a total number of the rows is used as a number of columns, to form the virtual row and column matrix.

In some embodiments, S2.3: a block method is used, in which the imaging surface on which the imaging units are distributed in an equally spaced manner by means of longitude lines, latitude lines, transverse lines, spiral lines, or no reference object is divided into one or more equal-area or unequal-area blocks based on a principle that a number of the imaging units in each of the blocks is equal and is equal to a reference value, and when the number of the imaging units in the block of the imaging surface is less than the reference value, virtual imaging units are used for supplementation until the reference value is reached, and the equal number of the imaging units in the block are regarded as a virtual row; and the rows obtained by the above method are used as rows, and a number of all the blocks is used as a number of columns, to form the virtual row and column matrix.

In some embodiments, S2.4: a virtual longitude line cutting method is used, in which any longitude line on the imaging surface that passes through a central point of a spherical structure is used as a virtual longitude line, the virtual longitude line rotates clockwise or counterclockwise with a diameter line perpendicular to a spherical surface and passing through a central point of the spherical surface as a rotation axis, and the virtual longitude line in a preset time period is cut into an equal number of imaging units distributed on the imaging surface in an equally spaced manner by means of latitude lines, transverse lines, spiral lines, or no reference object to serve as a virtual row; and the rows obtained by the above method are used as rows, and a number of virtual rows obtained by rotating the virtual longitude line by one circle is used as a number of columns, to form the virtual row and column matrix.

In some embodiments, S2.5: a longitude line method is used, in which each longitude line for an equal number of imaging units on the imaging surface on which the imaging units are distributed in a manner of longitude lines is used as a row, and a number of all longitude lines is used as a column of columns, to form the virtual row and column matrix.

In some embodiments, S2.6: a spiral line layout method is used, in which the imaging units are divided into a plurality of parts with an equal number of imaging units, and the number of imaging units are selected from a first imaging unit at a starting point of a spiral line to serve as a virtual row, until the last imaging unit on the spiral line is selected; and the equal number of imaging units selected are used as the virtual row, and a number of all virtual rows is used as a column of virtual columns, to form the virtual row and column matrix.

Or S2.7: a point interval sampling method is used, in which the imaging units are subjected to point interval sampling after the virtual row and column matrix is obtained in S2, an odd number of groups form a matrix, an even number of groups form a matrix, and the two matrices receive different view image matrix data of a same picture in a matched way respectively for displaying a dual view image video.

In some embodiments, in S3.1, an image data set file in an original matrix form is output, or in S3.2, pixel coordinates and pixels in the virtual row and column matrix are subjected to spherical surface restoration and then stitched to output a spherical image file.

The present disclosure further provides an image sensor, including the above imaging apparatus, where an imaging element in the imaging apparatus is embodied as a photosensitive element in the image sensor, an imaging surface is embodied as a photosensitive surface, and imaging units on the imaging surface are embodied as photosensitive units; or the image sensor further includes a matrix generator connected to the imaging element, a data reader connected to the matrix generator, and an image processor connected to the data reader; and when the image sensor works, the above imaging method is executed, the matrix generator processes the photosensitive units arranged in a non-matrix manner on the imaging surface of the imaging element through a logic circuit built in the matrix generator to generate a virtual matrix arranged in a matrix manner, photosensitive data obtained by the photosensitive units on the virtual matrix from outside is read by the data reader and then transmitted to the image processor, and the image processor processes the input data and outputs a corresponding image file.

In some embodiments, the image sensor is separately encapsulated or encapsulated together with an auxiliary lens; and when the image sensor and the auxiliary lens are encapsulated together, the auxiliary lens has one side facing a photosensitive hole and the other side facing away from the photosensitive hole and facing the imaging surface of the imaging element of the image sensor, and a focal point of the auxiliary lens coincides with a spherical center of the spherical imaging surface.

The present disclosure further provides a camera, including a camera body and a lens, where a camera obscure inside the camera body is internally provided with a shutter, an built-in auxiliary lens, the above image sensor, and an image data processing and output module from front to back; a viewfinder lens is arranged at a front end of the lens, and a lens combination is arranged inside a lens barrel of the lens; the components inside the camera body are arranged in combination with the components of the lens in the way of any one of the above imaging apparatuses, an imaging element in the imaging apparatus is embodied as an image sensor in the camera, an imaging surface is embodied as a photosensitive surface of the image sensor, and an image source is embodied as the viewfinder lens; any one of the above imaging methods is executed; the built-in auxiliary lens adopts a spherical lens; a focal point of the built-in auxiliary lens coincides with a central point of the spherical photosensitive surface of the image sensor, a central axis of the built-in auxiliary lens coincides with a central axis of the image sensor, and the built-in auxiliary lens is configured to cooperate with the lens combination to ensure that all light is perpendicularly irradiated on the photosensitive surface of the image sensor; and the image data processing and output module is configured to process image data obtained from the image sensor into files in various formats to be outputted, to synthesize a spherical image to be outputted, or to synthesize a spherical image and then convert the spherical image into a planar image to be outputted.

The present disclosure further provides a method for shooting and producing a panoramic image, where a camera with a convex spherical viewfinder lens uses a point in a space where the camera is located as a central point, the viewfinder lens faces away from the central point, scenes in all directions outside the central point are shot to obtain a plurality of images of a spherical picture, the plurality of images of the spherical picture are spliced into a panoramic image file for the complete spherical picture to be saved or outputted; a panoramic image contains wide area scenes in all the directions outside the central point, and herein is called a wide area source panoramic image for short; and the image is displayed on a display screen with a concave spherical display surface.

A camera with a concave spherical viewfinder lens uses a point in a space where the camera is located as a central point, the viewfinder lens faces the central point, scenes in all directions inside a region between the camera and the central point are shot to obtain a plurality of images of a spherical picture, the plurality of images of the spherical picture are spliced into a panoramic image file for the complete spherical picture to be saved or outputted; a panoramic image contains local area scenes in all the directions between the camera and the central point, and herein is called a local area source panoramic image for short; and the image is displayed on a display screen with a convex spherical display surface.

The present disclosure further provides a display screen, including the above imaging apparatus, where an imaging element of the imaging apparatus is embodied as an image display element in the display screen, an imaging surface is embodied as an image display surface, and imaging units on the imaging surface are embodied as display pixels; or/and the display screen displays an image file from a spherical picture shot and outputted by a camera or a shooting device in the above imaging method.

The display screen further includes an image processing module and a scanning module, where the scanning module has one side connected to the display pixels on the display surface and the other side connected to the image processing module; a display pixel matrixer in the scanning module includes a matrix generation logic circuit or program instruction for one or more display pixels; when the display screen works, the display pixel matrixer performs matrixing in advance on the display pixels arranged in a non-matrix manner on the display surface through the matrix generation logic circuit or the program instruction; an image pixel matrixer in the image processing module includes a matrix generation logic circuit or a program instruction for one or more image pixels, and a matrix type of the matrix generation logic circuit or the program instruction for the image pixels is the same as that of the matrix generation logic circuit or the program instruction for the display pixels in the scanning module; and when the display screen displays an image, an image determination program in the image processing module directly transmits a matrixed spherical image data set file to a matcher in the scanning module, a non-matrixed spherical image file for the image pixels is matrixed through the image pixel matrixer, matrixed spherical image data is transmitted to the matcher in the scanning module, a planar image is converted into a spherical image through an image converter in the image processing module, then matrixed by the image pixel matrixer and transmitted to the matcher in the scanning module, the matcher performs type matching on an image pixel matrix and a display pixel matrix in the scanning module, and after the matching succeeds, the scanning module scans and writes data of the image pixels into the corresponding display pixels on the display surface based on the corresponding matrix, to implement image display.

The present disclosure further provides a fan display screen, including any one of the above imaging apparatuses, where an imaging element of the imaging apparatus is embodied as a fan in the fan display screen, an imaging surface is embodied as a rotary surface formed by rotating a fan blade of the fan towards outer surfaces of audiences, and imaging units on the imaging surface are embodied as representations of lamp beads on an outer surface of the fan blade at time coordinate points; the fan display screen further includes a control mechanism, the control mechanism includes a control board and a driving motor, and a driving end of the driving motor is connected to the fan blade of the fan; the fan blade is a rod of an arc-shaped structure, the arc-shaped structure is a spherical structural member between parallel surfaces obtained by intercepting a conventional spherical surface or a Fresnel spherical surface from two parallel surfaces with a relatively small spacing, the lamp beads are arranged on the outer surface of one side of the fan blade that faces the audiences, the fan and the lamp beads are electrically connected to the control board, light emitted by the lamp beads is perpendicular to the surface, where the lamp beads are located, of the fan blade, the motor drives the fan blade to rotate, and the control board executes the above imaging method, to implement display imaging of a picture; or/and the display screen displays an image file from a spherical picture shot and outputted by a camera or a shooting device in the above imaging method.

The present disclosure further provides a projection apparatus, including any one of the above imaging apparatuses, where in the imaging apparatus, an imaging element is embodied as a projection display screen in the projection apparatus, an imaging surface is embodied as an image display surface of the projection display screen, imaging units are reflective particles coated on or projection units arranged on the image display surface of the projection display screen, and an image source is embodied as a projection host; the projection host is a point-shaped image signal particle projector, an arc-shaped image signal particle projector, or a spherical image signal particle projector; and an image signal particle emission apparatus of the point-shaped image signal particle projector or the arc-shaped image signal particle projector is driven by a driving apparatus connected thereto to project image signal particles onto the spherical projection screen based on an instruction given by an action instruction unit, and/or the above imaging method is executed, to implement picture display.

The present disclosure further provides a glasses type panoramic display device, including a glasses frame, display screens, earphones, a file processing module, and a control handle, where image display surfaces of the display screens are of a concave spherical structure or a convex spherical structure, the spherical structure is a conventional spherical structure, a Fresnel spherical structure, or a combination of Fresnel spherical structures, and the display screens are arranged in rims of the glasses frame and located directly in front of the eyes of a spectator during wearing; and there is one or two display screens, and when there are two display screens, the display screens display a picture in a same region of a same picture of a panoramic image file shot and synthesized by a single view camera separately, or display pictures of different views in a same region of a same picture of a panoramic image file shot and synthesized by a dual view camera respectively.

The present disclosure further provides a cinema, including a projection room, a spectator stand, a sound system, and a display screen, where the display screen is any one of the above display screens, and the projection room is provided with a concave spherical display screen with a concave spherical display surface, a convex spherical display screen with a convex spherical display surface, or a concave spherical display screen with a concave spherical display surface and a convex spherical display screen with a convex spherical display surface; according to the cinema with the projection room in which a concave spherical display screen is arranged, when the display surface of the display screen is a relatively small part of a complete spherical surface, the display screen is arranged in one side of the projection room, and the spectator stand is a platform or a slope located in the other side of the projection room; when the display surface of the display screen is a complete spherical surface or spherical surfaces of other parts are close to the complete spherical surface except a small part of spherical gap of the display screen that intersects with the ground of the projection room, the display screen is arranged in an upper space in a middle of the projection room and is fixed to an inner wall of the projection room through a fixing frame, and the spectator stand is a platform or a slope located at a position close to a lower part in a middle of the display surface and is completely enclosed by the display surface; according to the cinema with the projection room in which a convex spherical display screen is arranged, when the display surface of the display screen is a relatively small part of a complete spherical surface, the display screen is arranged in one side of the projection room, and the spectator stand is a platform or a slope located in the other side of the projection room; when the display surface of the display screen is a complete spherical surface or spherical surfaces of other parts are close to the complete spherical surface except a small part of spherical gap of the display screen that intersects with the ground of the projection room, the display screen is arranged on the ground at a lower part in the middle of the projection room, and the spectator stand is a platform or a slope around the convex spherical display screen; according to the cinema with the projection room in which two spherical display screens which are a concave spherical display screen and a convex spherical display screen respectively are arranged, the display surface of the concave spherical display screen and the display surface of the convex spherical display screen are complete spherical surfaces or spherical surfaces of other parts are close to the complete spherical surfaces except a small part of spherical gaps of the display screens that intersect with the ground of the projection room, a diameter of the display surface of the concave spherical display screen is greater than a diameter of the display surface of the convex spherical display screen, the concave spherical display screen is arranged at a position close to the upper space in the middle of the projection room and is fixed to the inner wall of the projection room through the fixing frame, and the convex spherical display screen is arranged at a position close to the ground at the lower part in the middle of the projection room or arranged on the ground and is located at a position close to a lower part in a middle of the concave spherical display screen and completely wrapped by the display surface of the concave spherical display screen; the spectator stand is located in a region between a horizontal plane passing through a spherical center of the display surface of the convex spherical display screen and a horizontal plane passing through a spherical center of the display surface of the concave spherical display screen or a region with an up-down height slightly greater than or slightly less than a height of the region and is located on or close to an annular ring of the display surface of the concave spherical display screen, and seats of the spectator stand face the display surface of the convex spherical display screen; and the concave spherical display screen and the convex spherical display screen display a wide area source panoramic image file and a local area source panoramic image file shot and outputted in a same scene, respectively.

The present disclosure has the following beneficial effects: straight lines in three dimensions X, Y, and Z of a rectangular coordinate system can be intactly, continuously and accurately projected onto a spherical curved surface by using a spherical projection surface to completely, intactly and accurately obtain a scene image, and the obtained image is displayed by using the display device whose display surface has the same structure as and is corresponding to a reverse spherical display surface, such that a highly vivid three-dimensional picture completely consistent with a scene is presented, thereby overcoming the historical defect that the highly vivid three-dimensional scene picture is difficult to obtain and present by a flat projection surface based imaging method. Moreover, a correct three-dimensional display method is provided for three-dimensional display and VR display, such that the three-dimensional display is more vivid and clearer, and the VR display does not have the defects of shallow depth of field, screen door effect, vertigo, narrow field of view, difficult focusing, and the like of an existing VR device.

Compared with the flat projection surface based imaging method, the spherical projection surface based imaging method has the advantages that light from an objective lens to the projection surface is less lost in the midway, and light projected onto all parts of the projection surface is perpendicular to the projection surface. Because a number of photons of the light perpendicular to the projection surface is maximal, the obtained picture has the highest definition; and because all the light is perpendicular, all parts of the picture are clear and have the consistent definition. Therefore, the overall definition of the image obtained by the spherical projection surface based imaging method is far greater than the overall definition of the image obtained by the flat projection surface based imaging method.

According to the imaging apparatus using the spherical projection surface based imaging method, all the incident light is perpendicular to the spherical projection surface, image light reflected by an external scene on a point, with certain longitude and latitude values, of the objective lens is presented at a coordinate position, with the same longitude and latitude, of the projection surface or at a coordinate point position composed of a negative number with the same longitude value and the same absolute value dimension after arriving at the projection surface, and the shape of the position of the projection surface is completely the same as that of the corresponding position of the objective lens, so the shape of the formed picture is also completely the same; and the image outputted after imaging is displayed by using the display device whose display surface has the same spherical shape as and is corresponding to the reverse display surface, and the picture is completely the same as the original scene without any deformation, thereby fundamentally getting rid of the defect of deformation which is difficult to overcome and exists for a long time in the existing flat projection surface based imaging method.

The image obtained by the spherical projection surface based imaging method is a spherical image, and the pixel coordinates of the image are coordinates in the form of spherical coordinates, so when the spherical images obtained by the spherical projection surface based imaging method are stitched into a spherical VR panoramic image, the phenomena of dislocation, picture damage and even chromatic aberration existing in stitching of planar images do not occur, all the parts of the picture can be accurately connected and stitched, and the quality of the stitched VR panoramic image is much higher than the stitching effect of the images obtained by the flat projection surface based method.

The spherical projection surface based imaging method solves many problems difficult to solve by the flat projection surface based imaging method, and can perfectly solve the problems in restoring real images with high vividness, high definition and high three-dimensional sense and the problems in using, connecting, and fusing virtual reality and mixed reality images; and the application and extended application of the imaging method are of great significance for the upgrading of technology in the entire field of human imaging.

BRIEF DESCRIPTION OF THE DRAWINGS

FIG. 13 is a schematic diagram of a cross section of a Fresnel ellipsoidal structure;

FIG. 14 is a schematic diagram of a cross section of a Fresnel paraboloidal structure;

FIG. 15 is a schematic diagram of a cross section of a structure formed by combining a plurality of Fresnel concave spherical surfaces;

FIG. 16 is a schematic diagram of a cross section of a structure formed by combining a plurality of Fresnel convex spherical surfaces;

FIG. 17 is a schematic diagram of a cross section of a Fresnel concave spherical structure;

FIG. 18 is a schematic diagram of a cross section of a Fresnel convex spherical structure;

FIG. 24 is a schematic diagram of scanning by a method for supplementing actual imaging units arranged in a manner of latitude lines with virtual imaging units;

FIG. 25 is a schematic diagram of scanning by a method for supplementing actual imaging units arranged in a manner of transverse lines with virtual imaging units;

FIG. 26 is a schematic diagram of scanning by a block method;

FIG. 27 is a schematic diagram of scanning by a sector block method;

in FIGS. 1 to 29, 1 denotes an imaging element, 2 denotes an imaging surface, 3 denotes an image source, 4 denotes an optical lens combination, and 5 denotes an auxiliary lens;

in FIGS. 31 to 33, 18-1 denotes a photosensitive element, 18-2 denotes a photosensitive surface, 18-3 denotes a matrix generator, 18-4 denotes a virtual data matrix, 18-5 denotes a data reader, 18-6 denotes an image processor, and 18-7 denotes an encapsulation housing of the image sensor;

FIG. 33 is a schematic diagram of a structure of a camera according to an embodiment;

in FIGS. 33 to 37, 19-1 denotes a camera body, 21-2 denotes a viewfinder lens, 19-3 denotes a lens combination, 19-4 denotes a shutter, 19-5 denotes a camera obscura, 19-6 denotes a built-in auxiliary lens, 19-7 denotes an image sensor, 19-8 denotes an image data processing and output module, 19-9 denotes a lens, and 19-10 denotes a polarizing filter;

FIG. 38 is a schematic diagram of a panoramic shooting device of a camera with a single convex spherical viewfinder lens and a panoramic shooting method thereof;

FIG. 39 is a schematic diagram of a panoramic shooting device of a camera with a plurality of convex spherical viewfinder lenses;

FIG. 40 is a schematic diagram of a panoramic shooting device of a camera with a single concave spherical viewfinder lens and a panoramic shooting method thereof;

FIG. 41 is a schematic diagram of a panoramic shooting device of a camera with a plurality of concave spherical viewfinder lenses;

in FIGS. 38 to 43, 20-1 denotes a camera, 20-2 denotes a camera carrier, and 20-3 denotes an image processing system;

in FIGS. 44 to 49, 21-1 denotes a display element, 21-2 denotes a display surface, 21-3 denotes a display pixel, 21-4 denotes a scanning module, 21-5 denotes an image processing module, and 21-6 denotes a housing;

in FIGS. 50 to 56, 22-1 denotes a control mechanism, 22-2 denotes a driving motor, 22-3 denotes a control board, 22-4 denotes a fan blade, 22-5 denotes a lamp bead, 22-6 denotes a processing module, and 22-7 denotes a data line;

in FIGS. 57 to 60, 23-1 denotes a projection host, 23-2 denotes a projection display screen, 23-3 denotes a bracket, 23-101 denotes a transparent projection screen, 23-102 denotes a spherical light source, 23-103 denotes an image processing system, 23-104 denotes an image signal particle emission gun, 23-105 denotes an action apparatus, and 23-106 denotes an action instruction system;

DESCRIPTION OF THE EMBODIMENTS

The present application is further described in detail below with reference to the accompanying drawings.

Figure 1:
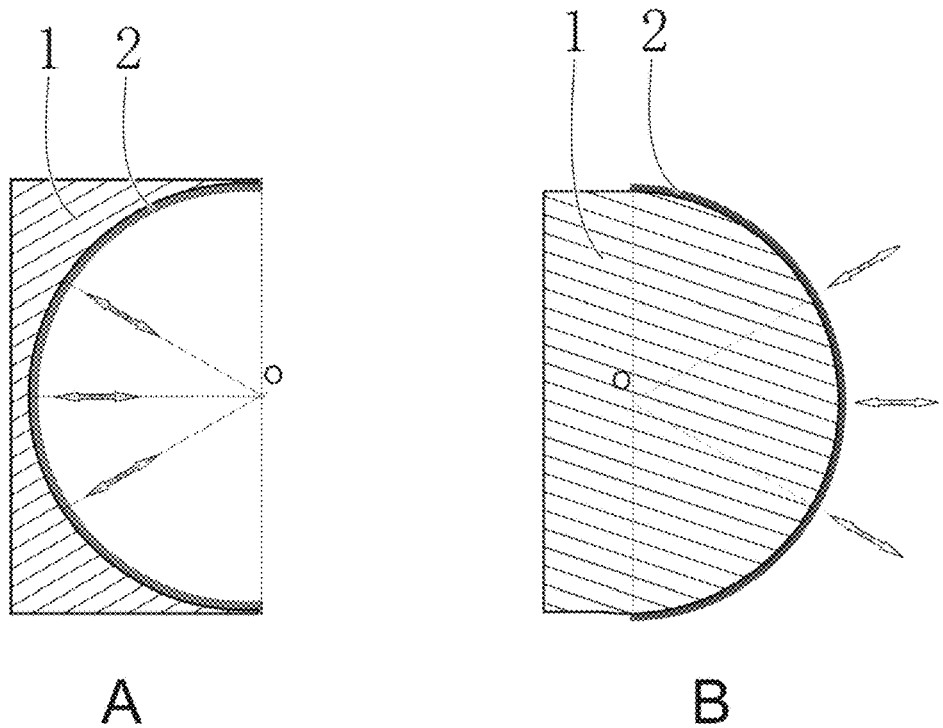
FIG. 1 is a schematic diagram of an imaging apparatus according to Embodiment 1, in which A is an imaging apparatus with an imaging surface of a concave spherical structure, and B is an imaging apparatus with an imaging surface of a convex spherical structure.

According to Embodiment 1, as shown in FIG. 1, an imaging apparatus includes an imaging element 1 with an imaging surface 2 of a spherical structure, where angles between all parts of a spherical surface of the imaging surface 2 and light emitted by an image source at an intersection of the imaging surface 2 are 90°, and a plurality of imaging units are distributed on the imaging surface 2.

When the imaging apparatus is a spherical image obtaining and shooting apparatus, the imaging element 1 is an image sensor or a camera negative film of a camera, and the imaging surface 2 is a photosensitive surface of the image sensor or the camera negative film; and the imaging units are photosensitive units on the photosensitive surface of the image sensor or photosensitive particles coated on the photosensitive surface of the negative film, and the light emitted by the image source is direct light of an external scene or indirect light passing through a camera lens, which is perpendicularly incident light relative to the imaging surface 2.

When the imaging apparatus is a self-luminous spherical image restoration display apparatus, the imaging element 1 is a display screen, the imaging surface 2 is a display surface of the display screen, the imaging units are display pixels on the display surface, the light emitted by the image source is light emitted by the display pixels on the display surface, and the main light is perpendicularly emitted light relative to the imaging surface 2.

When the imaging apparatus is a projection type spherical image restoration display apparatus, the imaging element 1 is a projection screen, the imaging surface 2 is an image display surface of the projection screen, and the imaging units are reflective particles coated on the image display surface of the projection screen; and the light emitted by the image source is light projected by a projection host onto the projection screen, which is perpendicularly incident light relative to the imaging surface 2.

When a model based on the imaging apparatus is embodied as a spherical image file, the imaging element 1 is a page or a frame of the image file, the imaging surface 2 is a picture of the page or the frame of the image file, the imaging units are image pixels of the picture, and the main light emitted by the image source is emitted light perpendicular to the picture.

Figure 2:
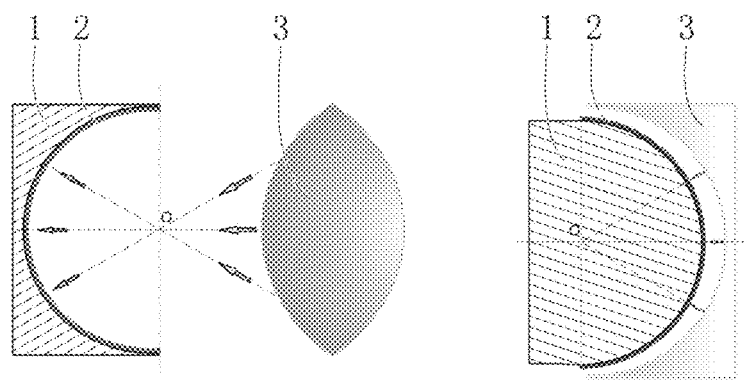
FIG. 2 is a schematic diagram of an imaging apparatus according to Embodiment 2, in which A is an imaging apparatus with a convex lens, and B is an imaging apparatus with a concave lens.

According to Embodiment 2, as shown in FIG. 2, an imaging apparatus includes an imaging element 1 with an imaging surface 2 of a spherical structure and an image source 3 of a spherical structure, where a spherical central point of the spherical imaging surface 2 of the imaging element 1 coincides with a focal point of the image source 3, an optical axis of the image source 3 coincides with a central symmetric axis of the imaging surface 2, and the imaging surface 2 and the image source 3 have opposite types of spherical structures, that is: when the imaging surface 2 is of a concave spherical structure, the image source 3 is of a convex spherical structure; and when the imaging surface 2 is of the convex spherical structure, the image source 3 is of the concave spherical structure.

Figure 3:
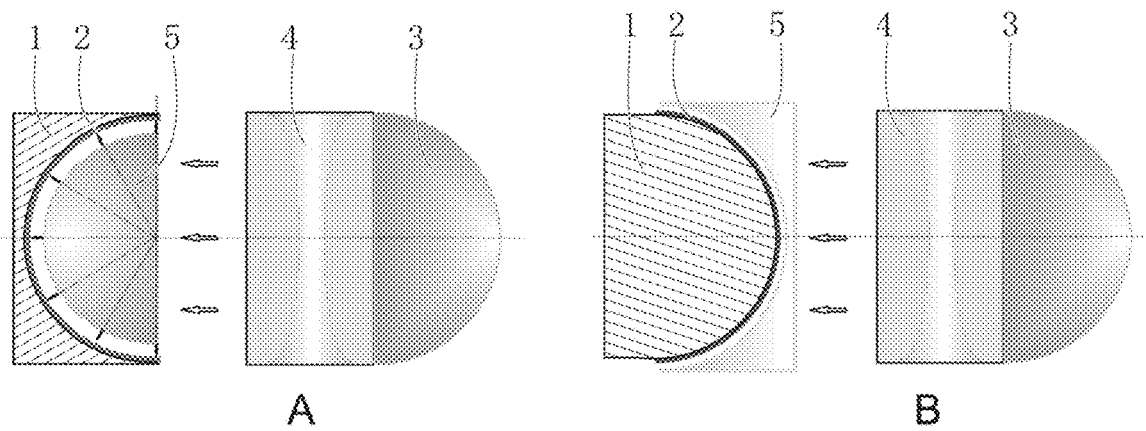
FIG. 3 is a schematic diagram of an imaging apparatus according to Embodiment 3, in which A is an imaging apparatus with an imaging surface of a concave spherical structure, and B is an imaging apparatus with an imaging surface of a convex spherical structure.

According to Embodiment 3, as shown in FIG. 3, an imaging apparatus includes an imaging element 1 with an imaging surface 2 of a spherical structure and an image source 3 of a spherical structure, where an optical axis of the image source 3 coincides with a central symmetric axis of the imaging surface 2; the imaging apparatus further includes an optical lens combination 4 and an auxiliary lens 5 that are located on a path of light, the optical lens combination 4 changes incident light into parallel light and emits the parallel light to the auxiliary lens 5, and a focal point of the auxiliary lens 5 coincides with a spherical center and a symmetric axis of the imaging surface 2; in this way, all light finally projected onto all parts of the spherical imaging surface 2 is perpendicular to the imaging surface 2. This embodiment is an improvement of Embodiment 2. The imaging apparatus with such a layout enables the imaging element 1 to be placed at any position of the optical axis, which is not limited to a position where the spherical center of the imaging surface 2 coincides with the focal point of the image source 3 any more.

Figure 4:
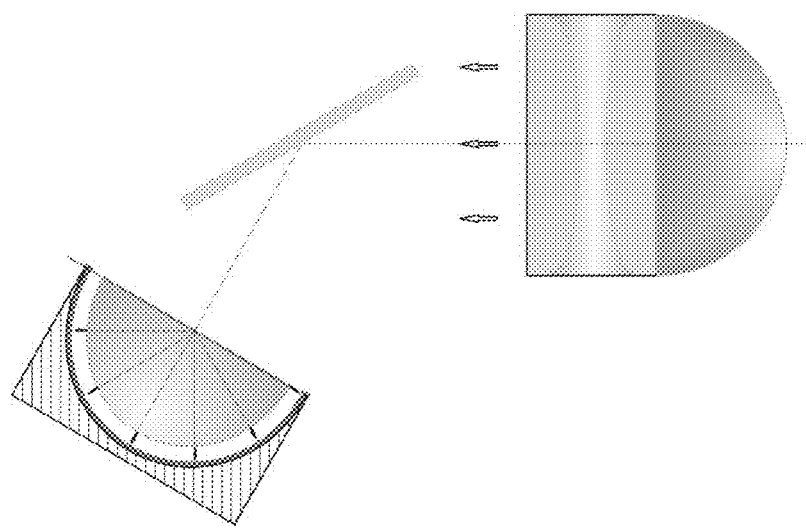
FIG. 4 is a schematic diagram of an imaging apparatus according to Embodiment 4.

According to Embodiment 4, as shown in FIG. 4, an imaging device of this structure is based on Embodiment 3, and a reflex mirror is placed on the path of light to change a general direction of light beams, such that a distance between the imaging surface 2 of the imaging element 1 and the image source 3, and an orientation can be flexibly adjusted.

Figure 5:
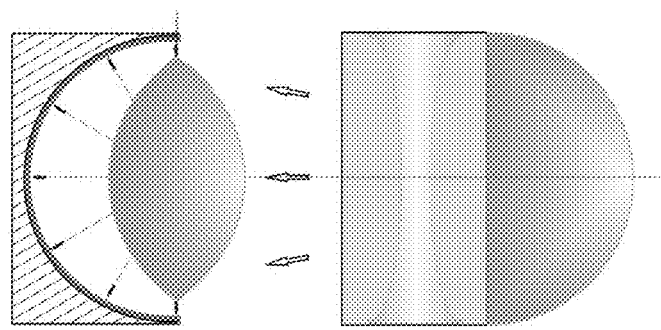
FIG. 5 is a schematic diagram of an imaging apparatus according to Embodiment 5.

According to Embodiment 5, As shown in FIG. 5, in an imaging apparatus of this structure, light emitted from an image source 3 or an optical lens combination 4 and irradiated to an auxiliary lens 5 is non-parallel light, a focal point of the auxiliary lens 5 and a spherical center of an imaging surface 2 do not necessarily coincide with each other, but are on a same axis, and the auxiliary lens 5 is arranged at an appropriate position on the common axis, such that the light is further adjusted through the auxiliary lens 5, and eventually all the incident light projected onto the imaging surface 2 is perpendicular to all corresponding parts of the spherical imaging surface 2. The imaging apparatus of such a structure can reduce the photon loss of the light during transmission, thereby further improving the quality of an obtained image.

Embodiments 1 to 5 are the imaging apparatuses based on the spherical imaging surface, and the formed original images are spherical, so the imaging apparatuses are collectively referred to as spherical imaging apparatuses, and imaging models based on the imaging apparatuses are referred to as spherical imaging models.

As shown in FIGS. 1 to 5, the spherical imaging surface 2, the image source 3, and the auxiliary lens 5 in the model according to Embodiments 1 to 5 are of a structure with a flat surface and a spherical surface, or a structure with two spherical surfaces, the spherical surface is a concave spherical surface or a convex spherical surface, and all the light emitted or received by the imaging units on the imaging surface 2 is perpendicular to the spherical imaging surface 2 where the imaging units are located.

Embodiments 2 to 5 are improvements in different manners based on Embodiment 1. There are still many improvement methods for a spherical imaging surface based imaging method, and different imaging models can be built under different improvement methods, so as to meet the requirements of various occasions and achieve the imaging effects of various purposes.

The spherical imaging apparatus according to Embodiments 2 to 5 is applicable to imaging of a camera with a spherical image sensor and a lens combined and a projection display and show apparatus with a spherical projection surface; and when the spherical imaging apparatus according to Embodiments 2 to 5 is the camera with the spherical image sensor and the lens combined, the image source 3 is a viewfinder lens at a front end of the camera, and when the spherical imaging apparatus is the projection display and show apparatus with the spherical projection surface, the image source 3 is a projection host that emits image light beams or particle beams.

Embodiments 2-5 can be used as a common spherical imaging model for the camera with the spherical image sensor and the lens combined. In the camera under the model, the light projected onto all the parts of the spherical imaging surface 2 of the spherical image sensor of the camera is perpendicular to the spherical photosensitive surface, such that a number of photons received by all parts of the photosensitive surface reaches the maximum, the images obtained by all the parts of the imaging surface 2 have the highest and consistent definition, the picture quality of the entire picture reaches a relatively optimal state, and the definition is higher than the definition of the images obtained by the imaging method based on the plane imaging surface 2; and the images of a spherical picture obtained by the spherical imaging apparatus are restored and displayed by using a screen with a corresponding reverse spherical display surface, such that while the original high definition is retained, the entire picture has no deformation and no blurring at all parts and has high fidelity and strong three-dimensional effect.

Similarly, in the projection and show apparatus under the model for the spherical imaging apparatus, light projected by the projection host onto all parts of the projection screen is perpendicular to the surface of the spherical projection screen, and the focus levels of photons obtained by all parts of the surface of the projection screen reach the maximum, such that while the picture quality of the entire picture reaches the best state, the entire picture has no deformation and no blurring at all parts and has high fidelity and strong three-dimensional effect.

Figure 6:
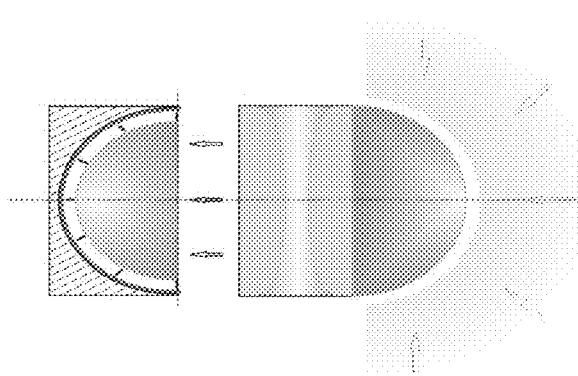
FIG. 6 is a schematic diagram that an imaging apparatus using a convex spherical surface as a transparent objective lens obtains a wide area scene.

As shown in FIG. 6, in the model according to Embodiments 2 to 5, the viewfinder lens at the front end of the camera using the imaging model with the image source 3 of the convex spherical structure is a convex lens, which is applicable to image shooting of wide area source scenes, and a field of view can be calculated based on a positive field of view; when the display device with the display surface of a convex spherical structure as shown in FIGS. 46, 48, 64, and 65 is used for restoration display, audiences see deformed mirror images from the front of the display surface and see clear and three-dimensional original images without deformation from the back of the display surface, but the display screen must be a transparent screen that can be watched from two sides; and when the display device with the display surface of a concave spherical structure as shown in FIGS. 47, 49, 50, 57, 62, and 63 is used for restoration display, the audiences see the clear and three-dimensional original images without deformation from the front of the display surface.

Figure 7:
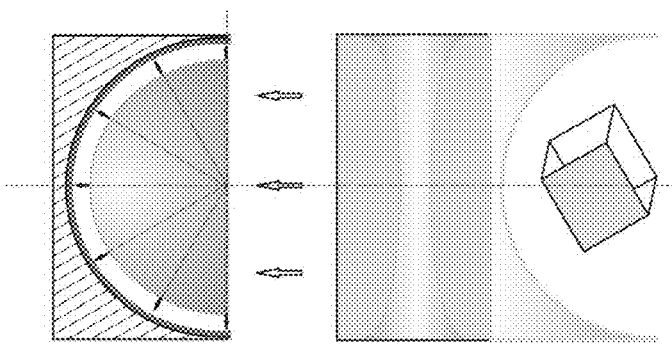
FIG. 7 is a schematic diagram that an imaging apparatus using a concave spherical surface as a transparent objective lens obtains a local area scene.
Figure 8:
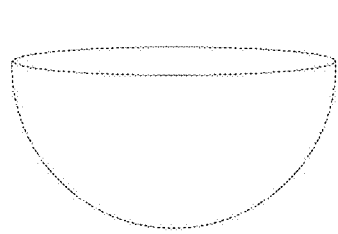
FIG. 8 is a schematic diagram of a conventional regular spherical structure.
Figure 9:
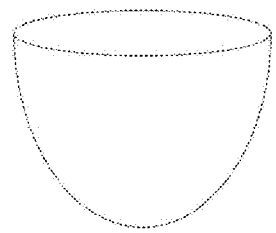
FIG. 9 is a schematic diagram of a conventional ellipsoidal structure.
Figure 10:
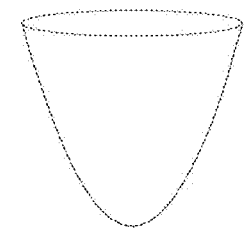
FIG. 10 is a schematic diagram of a conventional paraboloidal structure.
Figure 11:
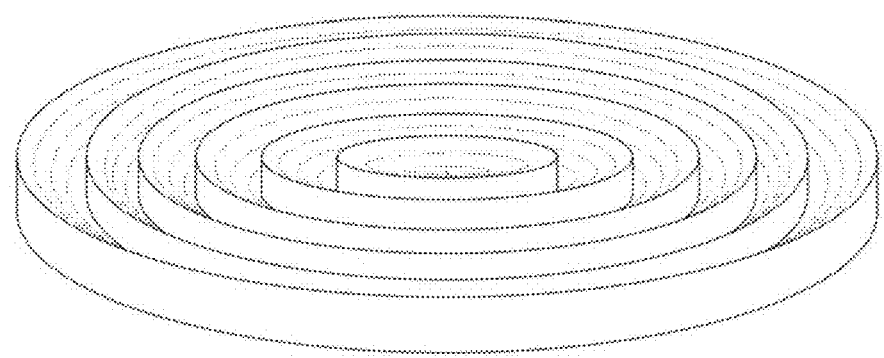
FIG. 11 is a schematic diagram of a Fresnel regular concave spherical structure.
Figure 12:
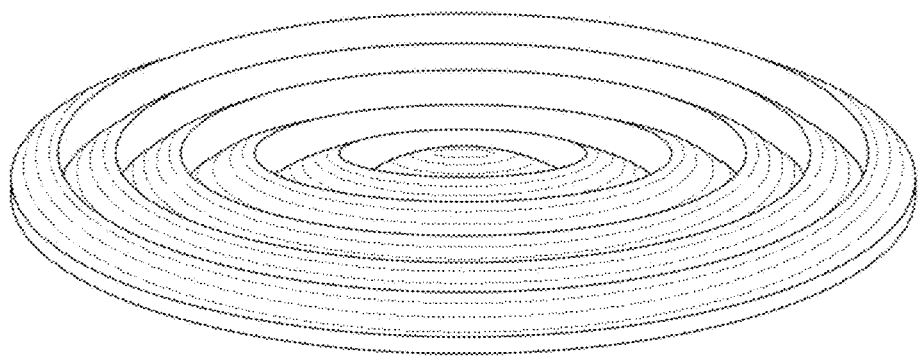
FIG. 12 is a schematic diagram of a Fresnel regular convex spherical structure.

As shown in FIG. 7, in the model according to Embodiments 2 to 5, the viewfinder lens at the front end of the camera using the imaging model with the image source 3 of the concave spherical structure is a concave lens, which is applicable to image shooting of local area source scenes in a limited range, such as shooting of a scene of a stage or an item, and during shooting, the stage or the item is located in a focal position of the transparent viewfinder lens at the concave spherical front end, and the shot images are clearest; a field of view can be correspondingly calculated based on a negative field of view; when the display device with the display surface of a concave spherical structure as shown in FIGS. 47, 49, 50, 57, 62, and 63 is used for restoration display, audiences see deformed mirror images from the front of the display surface and see clear and three-dimensional original images without deformation from the back of the display surface, but the display screen must be a transparent screen that can be watched from two sides; and when the display device with the display surface of a convex spherical structure as shown in FIGS. 46, 48, 64, and 65 is used for restoration display, the audiences see the clear and three-dimensional original images without deformation from the front of the display surface.

Therefore, the spherical image file shot and outputted by the camera with the spherical image sensor and the viewfinder lens being the convex lens is generally displayed by using the display device with the concave spherical display surface, and the spherical image file shot and outputted by the camera with the spherical image sensor and the viewfinder lens being the concave lens is generally displayed by using the display device with the convex spherical display surface.

As shown in FIGS. 8 to 18, a further improvement is that in the model according to Embodiments 1 to 5, the spherical structure of the imaging surface 2, the image source 3, and the auxiliary lens 5 includes a conventional spherical structure, a Fresnel spherical structure, or a combined structure of a plurality of Fresnel spherical structures. The conventional spherical structure is a conventional regular spherical structure, a conventional ellipsoidal structure, and a conventional paraboloidal structure; and the Fresnel spherical structure is a Fresnel regular spherical structure, a Fresnel ellipsoidal structure, and a Fresnel paraboloidal structure. When the imaging surface 2 is a Fresnel spherical surface, the imaging units are only distributed on an arc surface part of the Fresnel spherical surface, and the imaging units are not distributed on a vertical section part of the Fresnel spherical surface.

As shown in FIGS. 17 and 18, it is to be further noted that the Fresnel spherical structure includes a conventional Fresnel spherical structure, a Fresnel concave spherical structure, and a Fresnel convex spherical structure. The conventional Fresnel spherical structure is a structure with a flat surface and a Fresnel curved surface, the Fresnel concave spherical structure is a structure where a conventional Fresnel concave spherical surface is recessed inwards from a center of one side of the Fresnel curved surface, and the Fresnel convex spherical structure is a structure where a conventional Fresnel convex spherical surface is recessed inwards from a center of one side of the flat surface.

Different requirements and objectives can be achieved by using different spherical structures. For example, when the imaging surface 2 or the image source 3 is of the Fresnel spherical structure, the thin and light imaging apparatus with the spherical imaging model can be produced; when the imaging surface 2 or the image source 3 is of the ellipsoidal structure, the produced imaging apparatus with the spherical imaging model has the capability of obtaining or performing restoration display on deeper scene images and the capability of obtaining or performing restoration display on wider area lateral scene images; and when the imaging surface 2 or the image source 3 is of the paraboloidal structure, the imaging apparatus with the spherical imaging model has the capability of obtaining or restoring deeper scene images and the capability of more clearly obtaining or performing restoration display on wider area lateral scene images.

Figure 19:
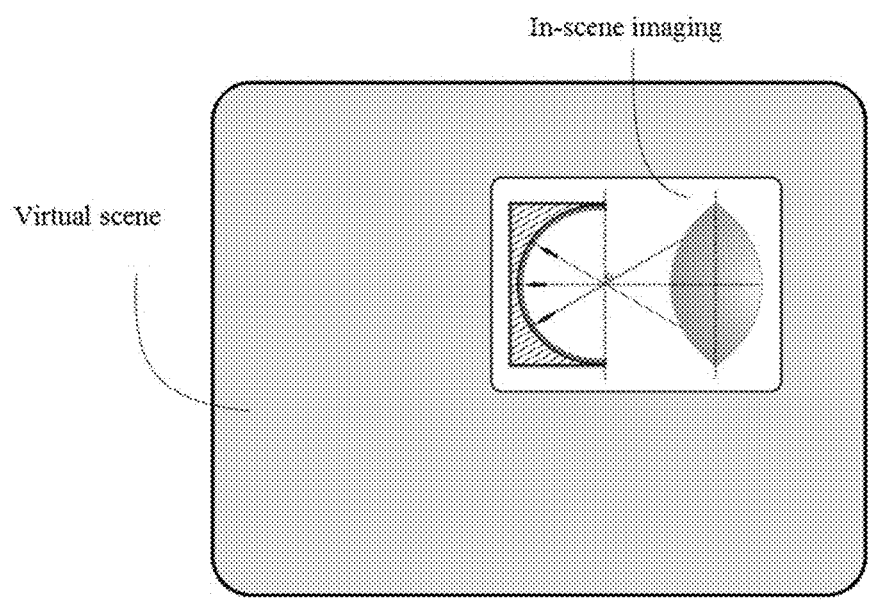
FIG. 19 is a schematic diagram of a spherical imaging method in virtual imaging.

An imaging method based on the spherical imaging apparatus according to Embodiments 1 to 5 includes a physical imaging method and a virtual imaging method. As shown in FIG. 19, when the imaging method is the virtual imaging method, the imaging element 1 is a virtual imaging element, the imaging surface 2 is a virtual imaging surface, the image source 3 is a virtual image source, the optical lens combination 4 is a virtual optical lens combination, and the auxiliary lens 5 is a virtual auxiliary lens; and virtual imaging refers to the act of obtaining or displaying spherical images in a virtual world scene by using the imaging method. That is to say, a function of obtaining or displaying the images in the virtual scene based on the imaging method is provided in image design and production tools.

The imaging units on the imaging surface 2 are regularly arranged, which not only facilitates numerical reading or writing of the imaging units and improves the reading and writing efficiency, but also allows for flexible selection and implementation of different layout methods for the imaging units for different application objects.

Figure 20:
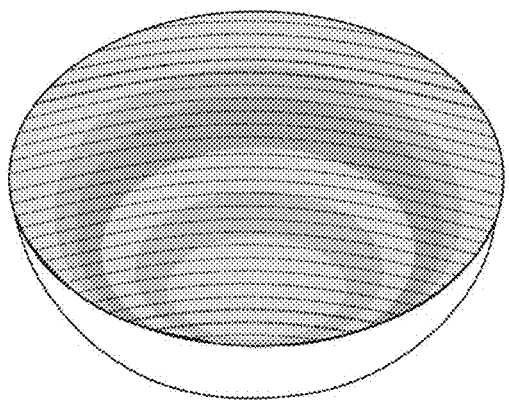
FIG. 20 is a schematic diagram of imaging units arranged in a manner of transverse lines.

According to Embodiment 6, as shown in FIG. 20, a layout method for the imaging units is provided, in which the imaging units are arranged on the imaging surface 2 starting from an edge of one side of the spherical imaging surface 2 in a manner of transverse lines, a spacing between adjacent two of the imaging units on a same transverse line is equal, and a spacing between adjacent two of the transverse lines is equal and is equal to the spacing between adjacent two of the imaging units on the same transverse line, where the spacing herein refers to a distance along the spherical surface between two points or two lines.

Figure 21:
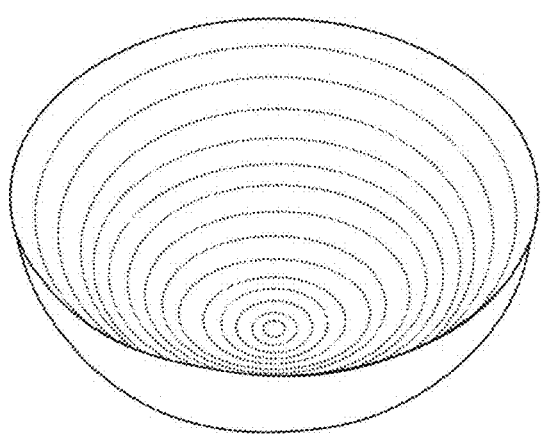
FIG. 21 is a schematic diagram of imaging units arranged in a manner of latitude lines.

According to Embodiment 7, as shown in FIG. 21, a layout method for the imaging units is provided, in which the imaging units are arranged on the imaging surface 2 with a center of the spherical imaging surface 2 as a polar point in a manner of latitude lines, a spacing between adjacent two of the imaging units on a same latitude line is equal, and a spacing between adjacent two of the latitude lines is equal and is equal to the spacing between adjacent two of the imaging units on the same latitude line, where the spacing herein refers to a distance along the spherical surface between two points or two lines.

Figure 22:
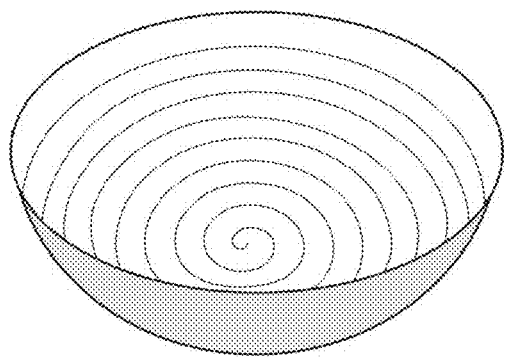
FIG. 22 is a schematic diagram of imaging units arranged in a manner of spiral lines.

According to Embodiment 8, as shown in FIG. 22, a layout method for the imaging units is provided, in which one or more spiral lines are marked with a central point of the imaging surface 2 or a point close to the central point as a starting point and a point on the edge of the imaging surface 2 as an end point, central points of the imaging units are placed on the spiral lines, and a spacing between adjacent two of the imaging units on a same spiral line is equal and is equal to a spacing between adjacent two of spirals or spiral lines, where the spacing herein refers to a distance along the spherical surface between two points or two lines.

Figure 23:
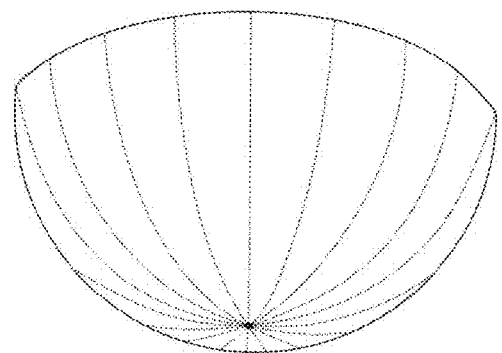
FIG. 23 is a schematic diagram of imaging units arranged in a manner of longitude lines.

According to Embodiment 9, as shown in FIG. 23, a layout method for the imaging units is provided, in which the imaging units are divided into a plurality of longitude lines with equal angles by using a center of the imaging surface 2 as a polar point, and the imaging units are arranged on each longitude line in an equally spaced manner.

According to Embodiment 10, the imaging units are unconditionally distributed on the imaging surface in an equally spaced manner without reference to any point, line, or surface.

In the layouts of the imaging units according to Embodiments 6 to 10, with respect to the longitude line layout, all the parts of the picture where the imaging units are arranged on the imaging surface 2 in a manner of the transverse lines, the latitude lines, or the spiral lines have the consistent definition; with respect to the transverse line layout, the latitude line layout or the spiral line layout has a low coefficient of difficulty, and the imaging units are easier to read and write and faster to read; therefore, the latitude line layout or the spiral line layout can be used as a common layout method for the spherical imaging surface 2 (the photosensitive surface of the image sensor, the display surface of the display device, or the page picture of the image file). The embodiment 10 can be used as a relatively simple and easy layout method, such as a coating layout applied to the negative film of the camera with the spherical image sensor or the surface of the projection screen of the spherical projection and show apparatus.

According to Embodiment 11, when the imaging units on the imaging surface 2 are subjected to numerical reading or writing, the imaging units are matrixed and then scanned and read or written, which can simplify a reading and writing algorithm and improve the reading and writing efficiency.

As shown in FIGS. 24 and 25, a matrixed scanning method is provided, in which the imaging units distributed on the imaging surface 2 in a manner of the latitude lines/transverse lines are used as actual imaging units, a number of the actual imaging units on a longest latitude line/transverse line is used as a reference number, the imaging units whose number is less than the reference number on other latitude lines/transverse lines are supplemented with the virtual imaging units in order to make a sum of the actual imaging units and the supplemented virtual imaging units on other latitude lines/transverse lines reach the reference number, and the latitude line/transverse line for the same number of imaging units whose number reaches the reference number is used as a row; and the rows obtained by the above method are used as rows, and a number of the latitude lines/transverse lines for all the imaging units on the imaging surface 2 is used as a number of columns, to form a virtual row and column matrix, and scan reading or scan writing is implemented.

According to Embodiment 12, a matrixed scanning method is provided, in which the imaging units distributed on the imaging surface 2 in a manner of the latitude lines/transverse lines are used as actual imaging units, a given number of the actual imaging units is used as a reference value, one of the latitude lines/transverse lines is used as a starting line, the actual imaging units are virtually picked line by line and point by point, if a number of the actual imaging units virtually picked from the starting latitude line/transverse line reaches the reference value, the starting latitude line/transverse line serves as a virtual row and recorded as a first row, or if the reference value is not reached, the imaging units continue being virtually picked from an adjacent next latitude line/transverse line, and the adjacent next latitude line/transverse line serves as a virtual row and recorded as a first row until the reference value is reached; virtual picking of the remaining actual imaging units from the latitude line/transverse line is included in virtual picking from a next virtual row; by analogy, until the actual imaging units on the last latitude line/transverse line of the imaging surface 2 are all virtually picked, and when a number of the actual imaging units virtually picked at last time does not reach the reference value, virtual imaging units are used for supplementation; and finally, the rows obtained by the above method are used as rows, and a total number of the rows is used as a number of columns, to form a virtual row and column matrix, and scanning is implemented.

According to Embodiment 13, as shown in FIG. 26 and FIG. 27, a matrixed scanning method is provided, in which the imaging surface 2 on which the imaging units are distributed in an equally spaced manner by means of longitude lines, latitude lines, transverse lines, spiral lines, or no reference object is divided into one or more equal-area or unequal-area blocks based on a principle that a number of the imaging units in each of the blocks is equal and is equal to a reference value, and when the number of the imaging units in the block of the imaging surface 2 is unequal, the number of the imaging units in the block with the maximum number of the imaging units is used as the reference value, the blocks with the number of the imaging units that is less than the reference value are supplemented with virtual imaging units until the reference value is reached, and the equal number of the imaging units in the block are regarded as a virtual row; and the rows obtained by the above method are used as rows, and a number of all the blocks is used as a number of columns, to form a virtual row and column matrix, and scanning is implemented; where a scanning method shown in FIG. 27 is a matrixed scanning method for equal-area sector blocks.

Figure 28:
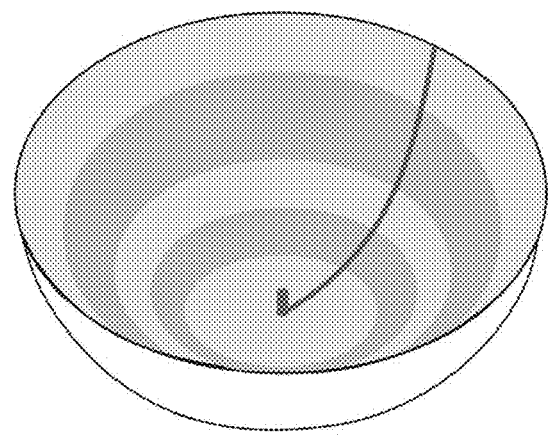
FIG. 28 is a schematic diagram of scanning by a virtual longitude line cutting method.

According to Embodiment 14, as shown in FIG. 28, a matrixed scanning method is provided, in which any longitude line on the imaging surface 2 that passes through a central point of a spherical structure is used as a virtual longitude line, the virtual longitude line rotates clockwise or counterclockwise with a diameter line perpendicular to a spherical surface and passing through a central point of the spherical surface as a rotation axis, and the virtual longitude line in a preset time period less than or equal to a time for which the virtual longitude line rotates by one circle is cut into an equal number of imaging units distributed on the imaging surface 2 in an equally spaced manner by means of latitude lines, transverse lines, spiral lines, or no reference object to serve as a virtual row; and the rows obtained by the above method are used as rows, and a number of virtual rows obtained by rotating the virtual longitude line by one circle is used as a number of columns, to form a virtual row and column matrix, and scanning is implemented.

Figure 29:
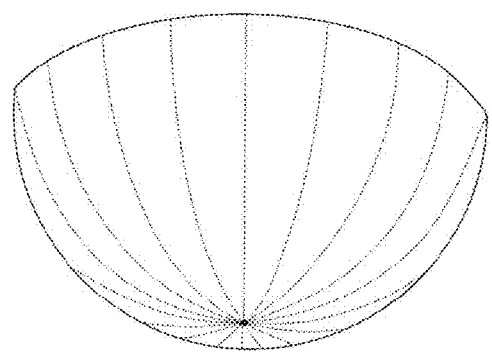
FIG. 29 is a schematic diagram of scanning by a longitude line cutting method.

According to Embodiment 15, as shown in FIG. 29, a matrixed scanning method is provided, in which each longitude line for an equal number of imaging units on the imaging surface 2 on which the imaging units are distributed in a manner of longitude lines is used as a row, and a number of all longitude lines is used as a column of columns, to form a virtual row and column matrix, and scanning is implemented.

According to Embodiment 16, a matrixed scanning method is provided, in which the imaging units arranged in a manner of spiral lines are divided into a plurality of parts with an equal number of imaging units, and the number of imaging units are selected from a first imaging unit at a starting point of a spiral line to serve as a virtual row, until the last imaging unit on the spiral line is selected; and the equal number of imaging units selected are used as the virtual row, and a number of all virtual rows is used as a column of virtual columns, to form a virtual row and column matrix, and scanning is implemented.

According to Embodiment 17, a matrixed scanning method is provided, in which the imaging units are subjected to point interval sampling after the virtual row and column matrix is obtained by the method according to Embodiments 12 to 16, an odd number of groups form a matrix, an even number of groups form a matrix, and the two matrices receive different view image matrix data of a same picture in a matched way respectively for displaying a dual view image video.

According to Embodiment 18, the image sensor converts a light image on the photosensitive surface into an electrical signal in proportion to the light image by using a photoelectric conversion function of a photoelectric device. The photosensitive surface of the existing image sensor product is mainly a flat surface, the obtained image generally has the phenomena of picture blurring and distortion, the shot image is applied to the field of VR, and the VR picture stitching has the problems of chromatic aberration, dislocation, picture damage, and the like.

Figure 30:
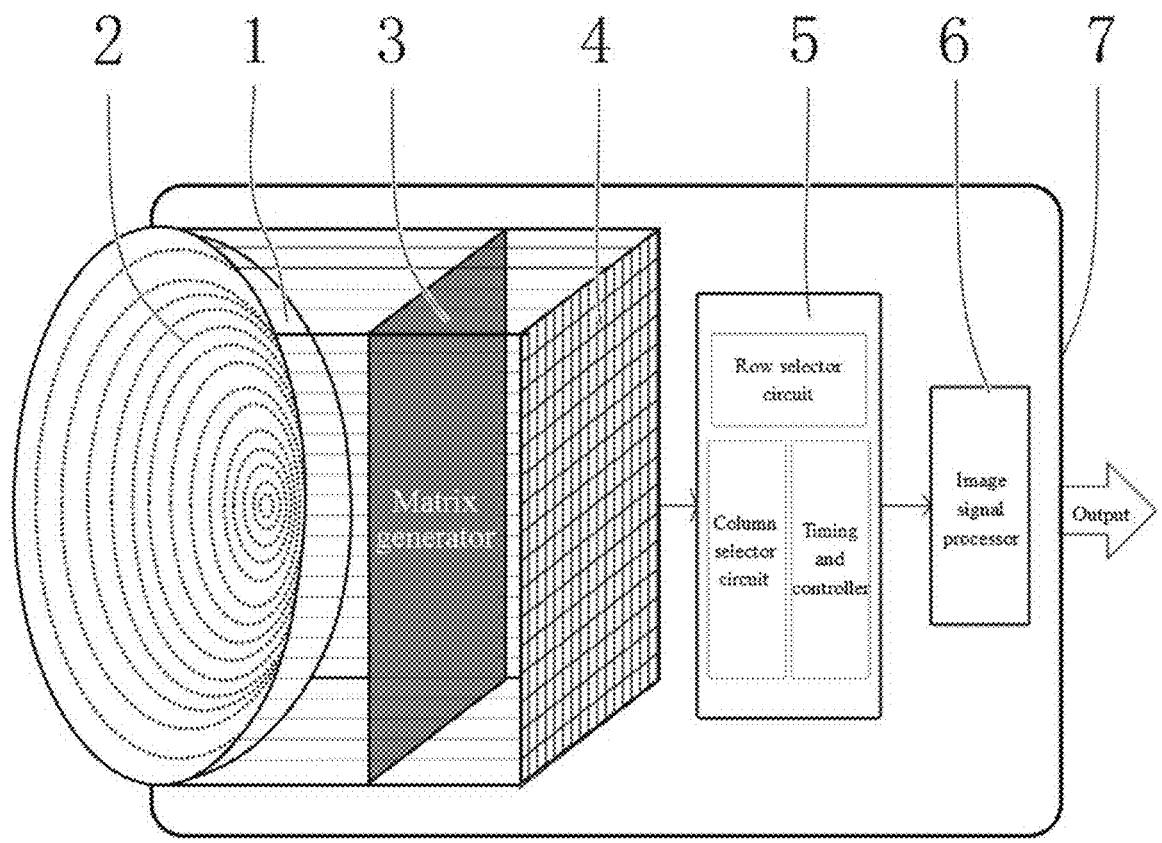
FIG. 30 is a schematic diagram of an overall structure of a spherical image sensor according to an embodiment.
Figure 31:
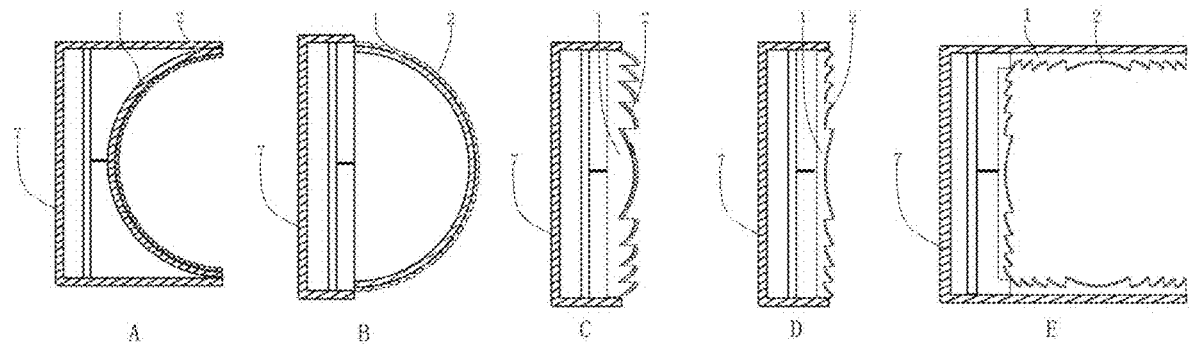
FIG. 31 is a schematic diagram of separately encapsulated spherical image sensors with four structures.
Figure 32:
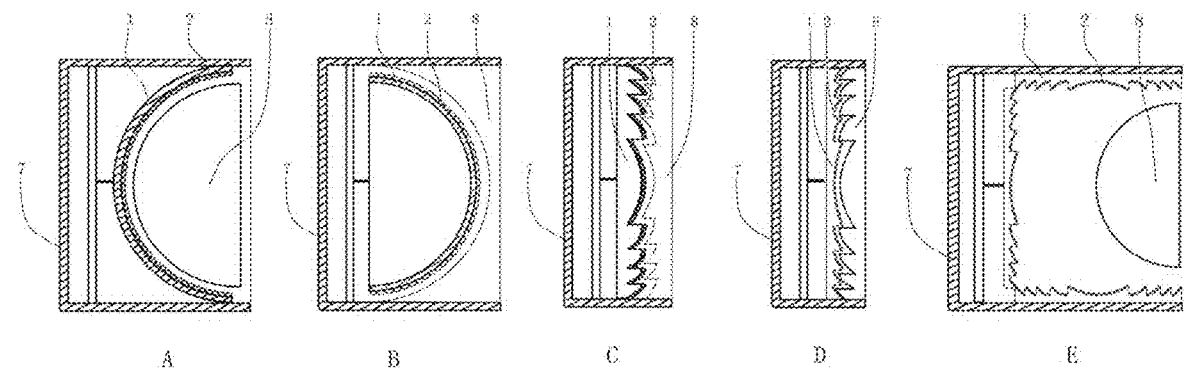
FIG. 32 is a schematic diagram of spherical image sensors with four structures mounted together with an auxiliary lens.

As shown in FIG. 30, FIG. 31, and FIG. 32, an image sensor is provided. The image sensor is a spherical image sensor of a spherical imaging model with reference to Embodiment 1 and includes an encapsulation housing 18-7 of the image sensor, and the encapsulation housing 18-7 internally includes a photosensitive element 18-1, a matrix generator 18-3 connected to the photosensitive element 18-1, a data reader 18-5 connected to the matrix generator 18-3, and an image information processor 18-6 connected to the data reader 18-5; the photosensitive surface 18-2 of the photosensitive element 18-1 is a part of a complete spherical surface, and a structure of a half of the complete spherical surface is a common structure of the spherical image sensor; photosensitive units are arranged on the photosensitive surface 18-2 according to any one of the layout methods in Embodiments 6 to 10, and light receiving surfaces of the photosensitive units are parallel to a section of the spherical photosensitive surface where the photosensitive units are located;

when the image sensor is mounted on the camera, all scene light projected onto the photosensitive surface 18-2 must be perpendicular to the light receiving surfaces of the photosensitive units of all parts on the photosensitive surface 18-2; and when the image sensor works, the matrix generator 18-3 processes the photosensitive units arranged in a non-matrix manner on the photosensitive surface 18-2 to generate a corresponding virtual matrix 18-4 through a logic circuit or a processing program which is built in the matrix generator 18-3 and contains one or more imaging unit matrixing methods in Embodiments 11 to 16, the data reader 18-5 reads image information obtained by the photosensitive units on the photosensitive surface 18-2 based on the virtual matrix 18-4 and then transmits the image information to the image information processor 18-6, the image information processor 18-6 processes the input image information into an image digital signal, and an image digital signal set with the same image pixel layout as the photosensitive units or the same image pixel matrix form as that used when the data reader 18-5 reads the image information is outputted.

A, B, C, D, and E in FIGS. 31 and 32 are image sensors whose photosensitive surfaces 18-2 are a conventional concave spherical surface, a conventional convex spherical surface, a Fresnel concave spherical surface, a Fresnel convex spherical surface, and a Fresnel concave spherical surface combination, respectively; in order to meet the requirements of various cameras, the spherical image sensor may be encapsulated separately as shown in FIG. 31 or may be encapsulated in the encapsulation housing 18-7 together with a spherical lens 18-8 having a flat surface and a spherical surface as shown in FIG. 32; during encapsulation, the flat surface of the spherical lens faces a photosensitive hole, the spherical surface of the spherical lens faces away from the photosensitive hole, and a focal point of the spherical lens coincides with a spherical center of the spherical image sensor; and when mounted inside the camera as a camera component, the image sensor is arranged at a position where the photosensitive hole is perpendicular to incident light. The image sensor with the photosensitive surface in the shape of a half of the complete spherical surface that is separately encapsulated, and the image sensor with the photosensitive surface in the shape of a half of the complete spherical surface that is encapsulated together with the lens in the shape of a half of the spherical surface can be used as an image sensor, with a common structure type, of the camera with the spherical image sensor.

This embodiment can be used as a universal or standard spherical image sensor, which, when applied to various cameras with spherical image sensors, helps to reduce and even eliminate the phenomena of blurring and distortion of the shot picture, and improves the picture definition and the VR picture stitching effect; and video files more adaptive to image playing of various spherical display screens are output.

According to Embodiment 19, image sensors of existing cameras are all of a planar structure or a variable structure based on the planar structure, which has the following problems: the shot picture is easy to blur and deform; it is difficult to achieve the high and consistent definition of the entire picture; the picture has insufficient depth of field and basically no three-dimensional effect; for shooting of a high-definition and large-view picture, there are high technical requirements for shooting, and repeated shooting and mode adjustment are carried out; and shooting of a VR picture needs to rely on VR forming and stitching software, and the stitching effect has the defects of dislocation, chromatic aberration, picture damage, etc.

Figure 33:
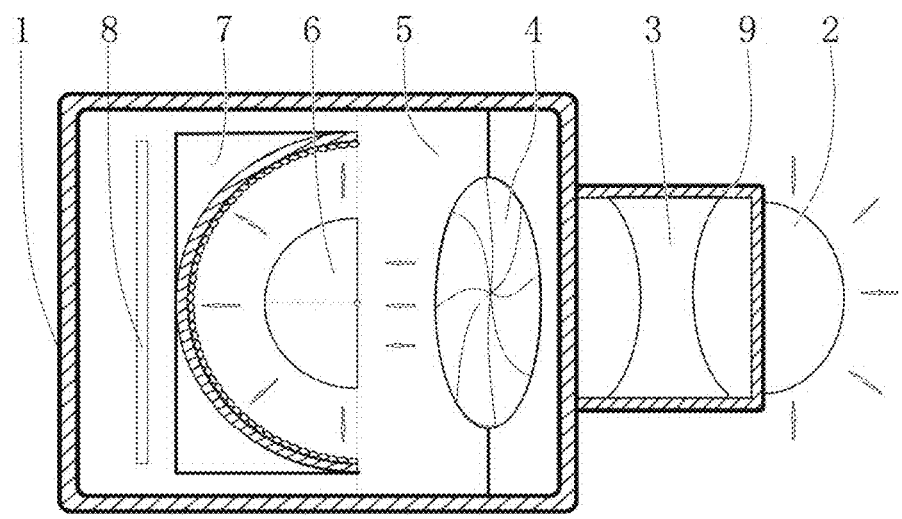
Figure 34:
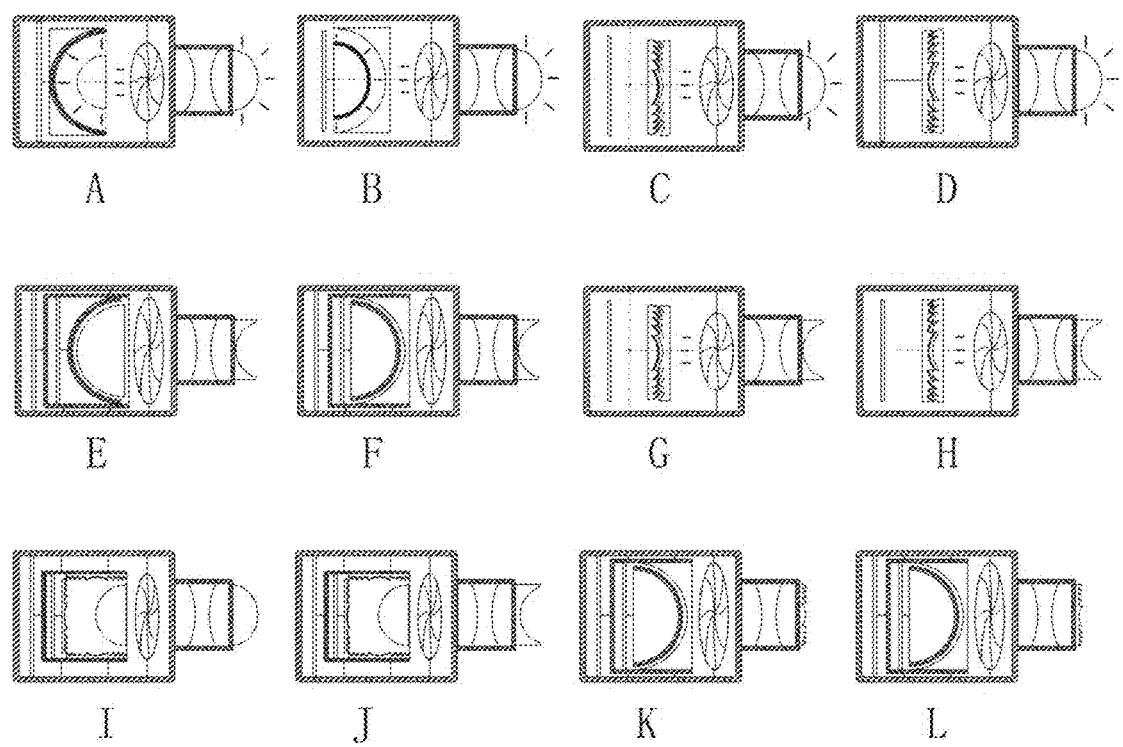
FIG. 34 is a schematic diagram of cameras with structures in different shapes according to an embodiment.
Figure 35:
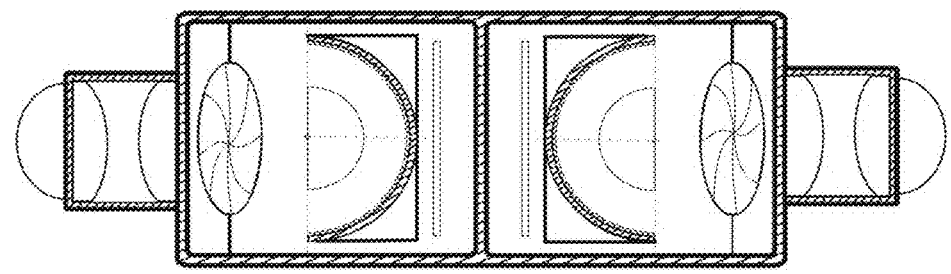
FIG. 35 is a schematic diagram of a structure of a 3D camera formed by combining two cameras.
Figure 36:
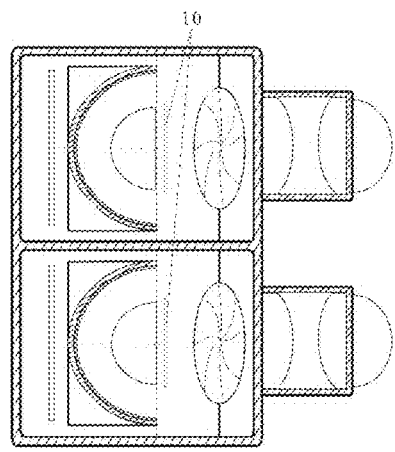
FIG. 36 is a schematic diagram of a structure of a panoramic camera formed by combining two cameras.

As shown in FIG. 33 and FIG. 34, a camera is provided. The camera is a camera based on the spherical imaging model according to Embodiment 3 and includes a camera body 19-1 and a lens 19-9, where a camera obscure 19-5 inside the camera body 19-1 is internally provided with a shutter 19-4, an auxiliary lens 19-6, an image sensor 19-7, and an image data processing module 19-8 from front to back; a viewfinder lens 19-2 is arranged at a front end of the lens 19-9, and a lens combination 19-3 is arranged inside a lens barrel of the lens 19-9; the image sensor 19-7 is the image sensor with the spherical photosensitive surface according to Embodiment 18; the auxiliary lens 19-6 is a spherical lens, when the image sensor 19-7 is a component encapsulated together with the spherical lens, the auxiliary lens 19-6 is located in an encapsulation housing of the image sensor 19-7, and when the image sensor 19-7 is a component encapsulated separately, the auxiliary lens 19-6 is located outside the image sensor 19-7 and inside the camera body 19-1; a focal point of the auxiliary lens 19-6 coincides with a central point of the photosensitive surface of the image sensor 19-7, and a central axis of the auxiliary lens coincides with a central axis of the image sensor 19-7;

the auxiliary lens 19-6 is configured to cooperate with the lens combination 19-3 to ensure that all light entering the camera is perpendicularly irradiated on all the photosensitive units on the photosensitive surface of the image sensor 19-7, such that a scene is clear without deformation no matter it is a far or close scene, or it is in a center or on an edge of a picture; and the image data processing module 19-8 is configured to process an image data set obtained from the image sensor 19-7 into image files in various formats or to synthesize a spherical image.

The auxiliary lens 19-6 is of a structure with two spherical surfaces or a structure with a spherical surface facing the image sensor 19-7 and a flat surface facing the shutter 19-4.

FIG. 34 shows different types of cameras produced by using image sensors, auxiliary lenses, and viewfinder lenses with different shapes and structures to meet shooting requirements of various scenes.

Figure 37:
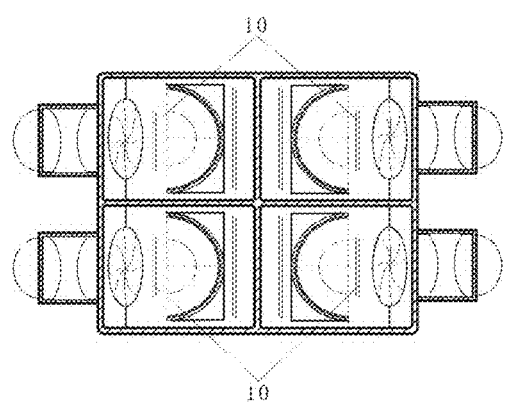
FIG. 37 is a schematic diagram of a structure of a 3D panoramic camera formed by combining four cameras.

The camera in this embodiment is a common structure of the camera with the spherical image sensor. Based on this structure, more types of cameras can be produced by adding or reducing components or adjusting the camera structure in combination with the spherical imaging model according to Embodiments 1, 2, 4, and 5 and extended models of the spherical imaging model according to Embodiments 2 to 5. In addition, the camera in this embodiment can be matched with other devices or combined with itself to produce more diverse cameras or shooting devices, such as a panoramic camera composed of two cameras as shown in FIG. 37, a dual view 3D camera composed of two cameras as shown in FIG. 38, and a dual view 3D panoramic camera composed of four cameras as shown in FIG. 39.

Compared with an existing camera with a planar image sensor, the camera with the spherical image sensor has the advantages that the optimal light receiving surface of the photosensitive surface of the image sensor is greatly improved, thus significantly improving the overall quality and field of view of the shot picture, reducing the difficulty of shooting a picture with a large field of view, simplifying a VR image synthesis process, and improving the efficiency and quality of VR image synthesis; and images directly outputted by the camera and synthesized VR images are played on a corresponding reverse spherical display screen, such that a presented picture has no or small deformation, high vividness, and stronger three-dimensional sense, and is clearer globally.

The camera in this embodiment may be a physical camera for shooting real world scenes or a virtual camera for shooting virtual world scenes. When the camera is the virtual camera, the camera refers to a function of three-dimensional mapping software that allows a designer to obtain and output images of the spherical picture from the picture designed by them.

According to Embodiment 20, an existing panoramic image is a wide area source or local area source panoramic image file formed by spherizing and stitching a plurality of planar images shot and outputted by one or more cameras with planar image sensors, the shot image has the phenomena of deformation/blurring/stretching/collapse, and a spherical panoramic image formed by stitching has the defects of image dislocation, damage, rigid and unnatural color transition, and the like.

A method for shooting a panoramic image is provided, involving a panoramic image shooting device, where the device includes a camera 20-1 with a spherical image sensor, a camera carrier 20-2, and an image processing system 20-3.

As shown in FIG. 38, according to the panoramic image shooting device in which the camera carrier 20-2 is provided with a camera with a spherical image sensor and a convex spherical viewfinder lens, under the control of its own driving apparatus or manpower, the camera 20-1 uses a point on the device itself or a point in a space where the device is located as a central point, a camera hole faces away from the central point and implements shooting of rotation about the central point, and the image processing system 20-3 splices a plurality of shot partially spherical images of a picture in all directions into a panoramic image file for the complete spherical picture to be saved or outputted.

As shown in FIG. 39, according to the panoramic image shooting device in which the camera carrier 20-2 is provided with a plurality of cameras with spherical image sensors and convex spherical viewfinder lenses, a point on the device itself or a point in a space where the device is located is used as a central point, camera holes of the plurality of cameras 20-1 are provided on carrier points on a physical spherical or virtual spherical carrying surface of the camera carrier 20-2 in a manner of facing away from the central point, and when the plurality of cameras 20-1 can cover scenes in all directions outside the central point, the cameras 20-1 implement shooting in a state of remaining stationary; when the plurality of cameras 20-1 can only cover scenes in part of directions outside the central point, the shooting device implements shooting of rotation about the central point; the image processing system 20-3 splices a plurality of partially spherical images of a picture shot by the cameras 20-1 in all directions into a panoramic image file for the complete spherical picture to be saved or outputted; and the camera with the spherical image sensor and the convex spherical viewfinder lens uses a point in a shooting space as a central point, scenes in all directions that are shot by camera holes facing away from the central point come from wide area scenes, and a panoramic image shot and outputted by the method is herein called a wide area source panoramic image for short.

Figure 42:
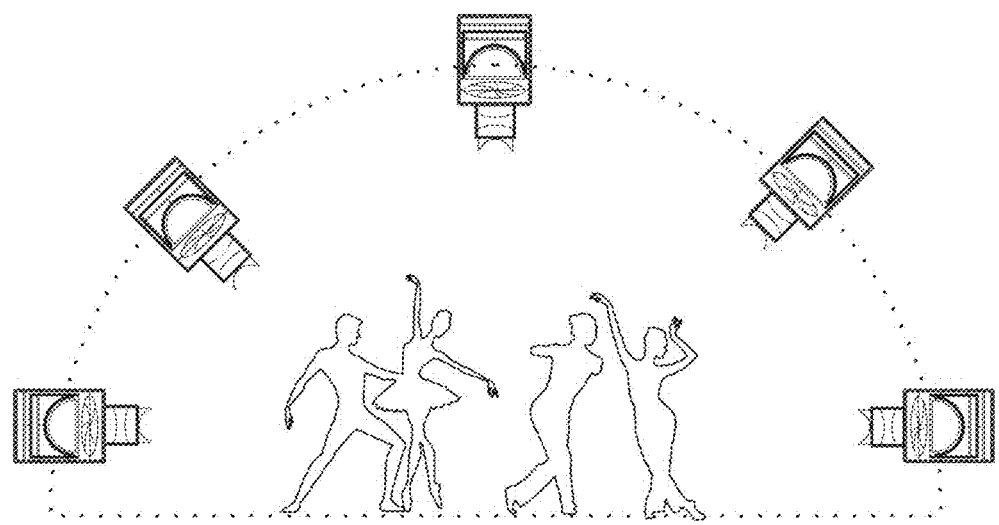
FIG. 42 is a schematic diagram of a method for shooting a local area source panoramic image by a panoramic shooting device.

As shown in FIGS. 40 and 42, according to the panoramic image shooting device in which the camera carrier 20-2 is provided with a camera with a spherical image sensor and a concave spherical viewfinder lens, a point in a scene of a shot object is used as a central point, a camera hole of the camera 20-1 faces the central point and performs mobile shooting on a physical spherical surface or a virtual spherical surface with a radius greater than a radius of a space occupied by the shot object, and the image processing system 20-3 splices a plurality of shot partially spherical images of a picture of scenes in all directions of the shot object into a panoramic image file for the complete spherical picture to be saved or outputted.

As shown in FIG. 41, according to the panoramic image shooting device in which the camera carrier 20-2 is provided with a plurality of cameras with concave spherical image sensors, a point in a space where a shot object is located is used as a central point, camera holes of the plurality of cameras 20-1 are provided on carrier points on a physical spherical or virtual spherical carrying surface of the camera carrier 20-2 in a manner of facing the central point, and when the plurality of cameras 20-1 can cover scenes in all directions of the shot object, the cameras 20-1 implement shooting in a state of remaining stationary; when the plurality of cameras 20-1 can only cover scenes in part of directions of the shot object, the shooting device implements mobile shooting around the central point; the image processing system 20-3 splices a plurality of shot partially spherical images of a picture in all directions into a panoramic image file for the complete spherical picture to be saved or outputted; and the camera uses a point in a shooting space as a central point, scenes in all directions that are shot by camera holes facing the central point come from scenes in a limited range between the central point and a virtual spherical surface or a physical spherical surface where the camera is located, and a panoramic image shot and outputted by the method is herein called a local area source panoramic image for short.

Figure 43:
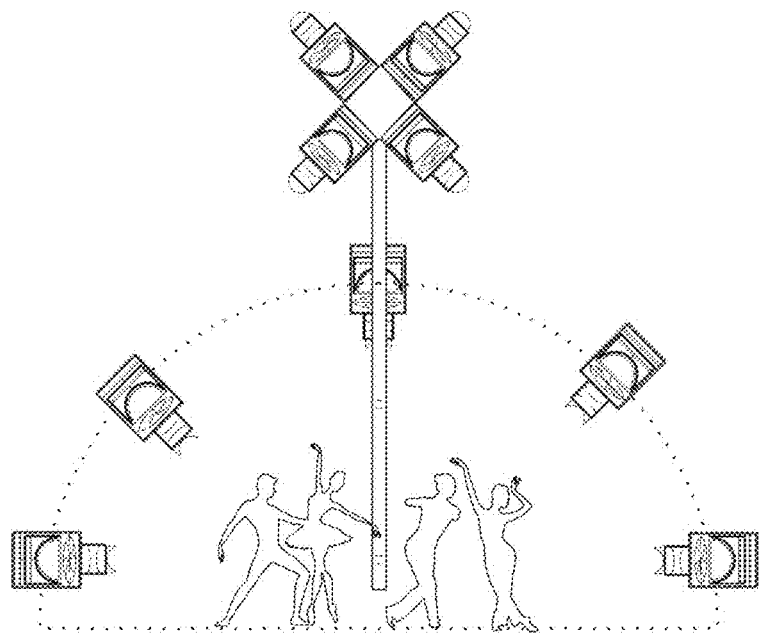
FIG. 43 is a schematic diagram that a panoramic shooting device simultaneously shoot a wide area source panoramic image and a local area source panoramic image in a same scene.

As shown in FIG. 43, in a same scene, a panoramic image is shot by using a method for shooting a wide area source panoramic image and a method for shooting a local area source panoramic image, and corresponding panoramic image files outputted respectively are displayed on different separate panoramic image display devices respectively or simultaneously.

In this embodiment, the shooting device including the camera with the spherical image sensor is used to shoot and output the panoramic image. On one hand, the original image shot and outputted by the spherical image sensor has a higher definition than that of the original image outputted by the camera with the planar image sensor, and the display device with the corresponding reverse spherical display surface is used to display the outputted image, such that the displayed picture has no or little deformation and blurring. On the other hand, the original image shot and outputted by the camera with the spherical image sensor is originally the spherical image, and when the panoramic image is synthesized, the process of spherizing is not needed, such that there is no phenomenon that the picture is destroyed and damaged in the process of spherizing the planar image, and the original spherical images are stitched into the spherical panoramic image. During splicing, original relative coordinates of pixels are not changed, and there is no phenomenon of low matching degree of splicing parts of the planar images, such that the panoramic image shot and outputted by the method has higher picture quality and is more efficient.

According to Embodiment 21, an existing OLED or liquid crystal display screen is a flat display screen or a display screen based on the flat display screen and not deviated from the change of a basic physical structure and a display method of the flat display screen, and the display screen hardly achieves the three-dimensional display effect; a spherical screen on the current market can also improve the three-dimensional display effect to a certain extent, but due to the constraints of conventional imaging methods, pixel layouts, scanning modes, image files, and image processing modes, the three-dimensional display effect is still not obvious, and there are phenomena of uneven resolution, deformation, and slow response of displayed pictures.

Figure 44:
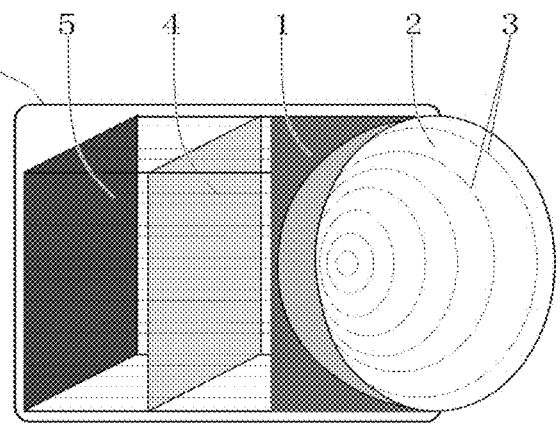
FIG. 44 is a schematic structural diagram of a spherical display screen according to Embodiment 21.
Figure 45:
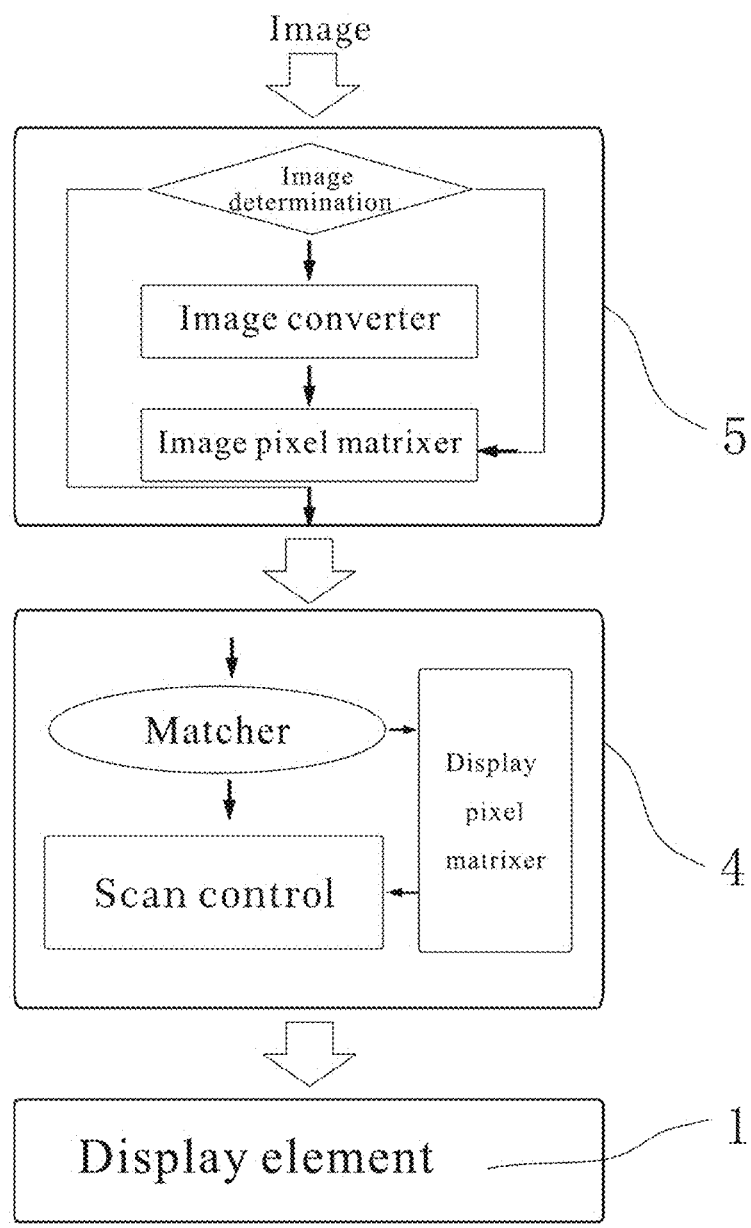
FIG. 45 is a schematic diagram of a working principle of a spherical display screen according to the present disclosure.

As shown in FIG. 44 and FIG. 45, a display screen with a spherical display surface is provided. The display screen is a display device based on the spherical imaging model according to Embodiment 1, and includes an external housing 21-6 and a display element 21-1 located at a front part of the housing 21-6 and whose display surface 21-2 is of a spherical structure; display pixels 21-3 are arranged on the display surface 21-2 according to any one of the layout modes in Embodiments 6 to 10, and light emitted by the display pixels 21-3 when energized is perpendicular to positions where the display pixels of the display surface 21-2 are located; and the display pixels 21-3 are connected to a scanning module 21-4.

A display pixel matrixer of the scanning module 21-4 includes a matrix generation logic circuit or a program instruction for one or more display pixels in Embodiments 11 to 16; and when the display screen works, the display pixel matrixer performs matrixing in advance on the display pixels arranged in a non-matrix manner on the display surface through the matrix generation logic circuit or the program instruction to form a display pixel matrix for later use.

An image pixel matrixer in an image processing module 21-5 includes a matrix generation logic circuit or a program instruction for one or more image pixels in Embodiments 11 to 16, and a matrix type of the matrix generation logic circuit or the program instruction for the image pixels is the same as that of the matrix generation logic circuit or the program instruction for the display pixels in the scanning module.

When the display screen displays an image, an image determination program in the image processing module 21-5 directly transmits a matrixed spherical image data set file to a matcher in the scanning module 21-4, a non-matrixed spherical image file for the image pixels is matrixed through the image pixel matrixer, matrixed spherical image data is transmitted to the matcher in the scanning module 21-4, a planar image is converted into a spherical image through an image converter in the image processing module, then matrixed by the image pixel matrixer and transmitted to the matcher in the scanning module 21-4, and after the matching succeeds, the scanning module 21-4 scans and writes data of the image pixels into the corresponding display pixels 21-3 on the display surface 21-2 based on the corresponding matrix, to implement image display. The display screen with a concave spherical display surface (for example, as shown in FIGS. 47 and 49) is configured to display images shot and directly outputted by a camera with a spherical image sensor and a viewfinder lens 19-2 in a convex spherical shape, a wide area source panoramic image formed by stitching the images shot and directly outputted by the camera with the spherical image sensor and the viewfinder lens 19-2 in the convex spherical shape, and a wide area source panoramic image formed by spherizing and stitching images shot and outputted by a camera with a planar image sensor.

Figure 46:
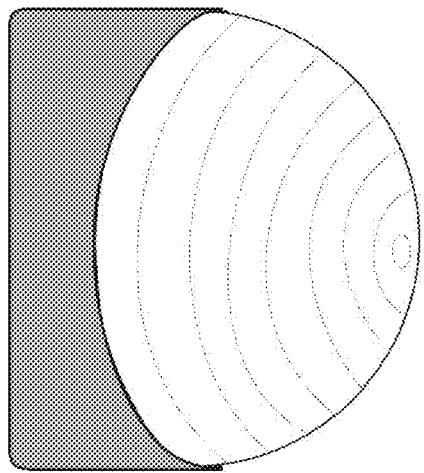
FIGS. 46 to 49 are schematic diagrams of shapes of a display surface of a display screen.
Figure 48:
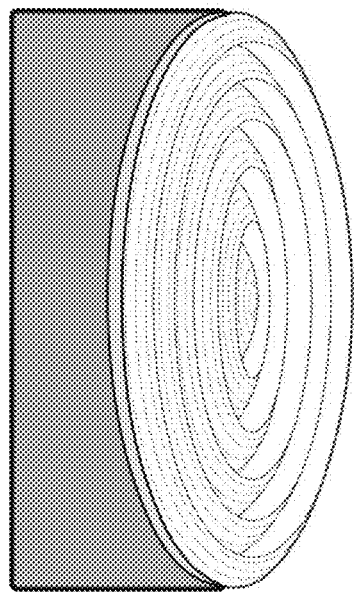

The display screen with a convex spherical display surface (for example, as shown in FIGS. 46 and 48) is configured to display images shot and directly outputted by a camera with a spherical image sensor and a viewfinder lens 19-2 in a concave spherical shape, a local area source panoramic image formed by stitching the images shot and directly outputted by the camera with the spherical image sensor and the viewfinder lens 19-2 in the concave spherical shape, and a local area source panoramic image formed by spherizing and stitching images shot and outputted by a camera with a planar image sensor.

Figure 47:
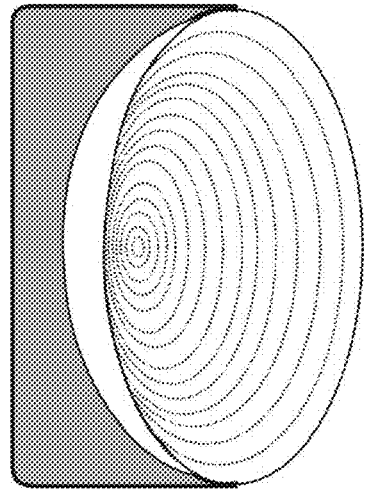
Figure 49:
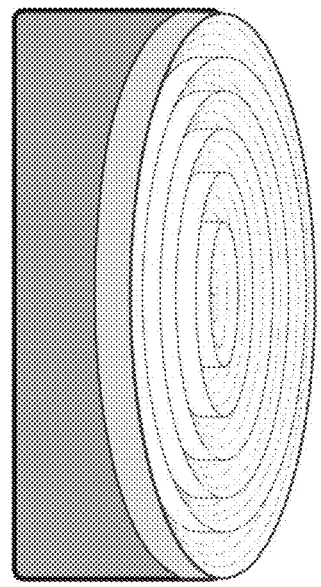

The display surface of the display screen in this embodiment is a conventional spherical surface as shown in FIGS. 46 and 47, a Fresnel spherical surface as shown in FIGS. 48 and 49, or a combination of Fresnel spherical surfaces. When the display surface is of a Fresnel spherical structure, a thin and light spherical display screen can be produced. The thin and light spherical screen is applied to a laptop or a mobile phone, which is convenient to carry while achieving the high-definition three-dimensional effect brought by the spherical screen.

Compared with a flat display screen based on a planar imaging model, the display screen based on the spherical imaging model in this embodiment not only displays clearer images without deformation, but also presents a stronger three-dimensional effect and allows the naked eyes to see a three-dimensional picture; for a VR device using the spherical screen in this embodiment, there is a higher degree of matching between the spherical screen and a VR image of a spherical picture, such that while the definition and deformation of the displayed picture are improved and reduced, the watching field of view and depth of field of the picture are also significantly improved, and the granular sensation and focusing difficulty of the picture are significantly reduced, thus significantly improving the picture quality and the three-dimensional effect; and if a panoramic image outputted by a shooting device with the camera with the spherical image sensor for the spherical imaging model is played cooperatively, the picture displayed by the VR device has higher quality and reaches a higher level.

According to Embodiment 22, an existing fan display screen plays a hollow picture and is placed at a certain height from the ground, and the played hollow picture is suspended in the air, thus giving people a feeling of aerial imaging. However, the existing fan display screen is still limited in three-dimensional effect, and has a single played object and a narrow range of application scenarios.

Figure 50:
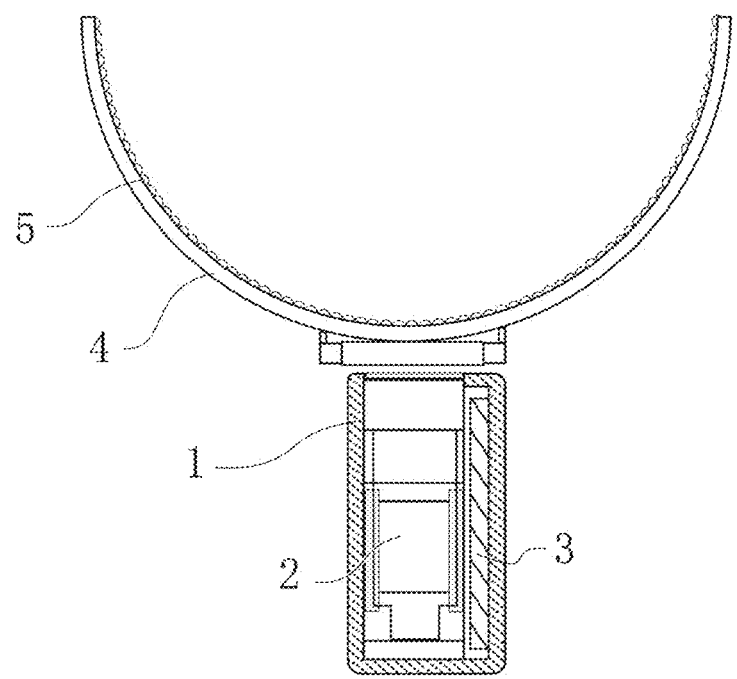
FIG. 50 is a schematic diagram of a fan display screen according to Embodiment 22.
Figure 51:
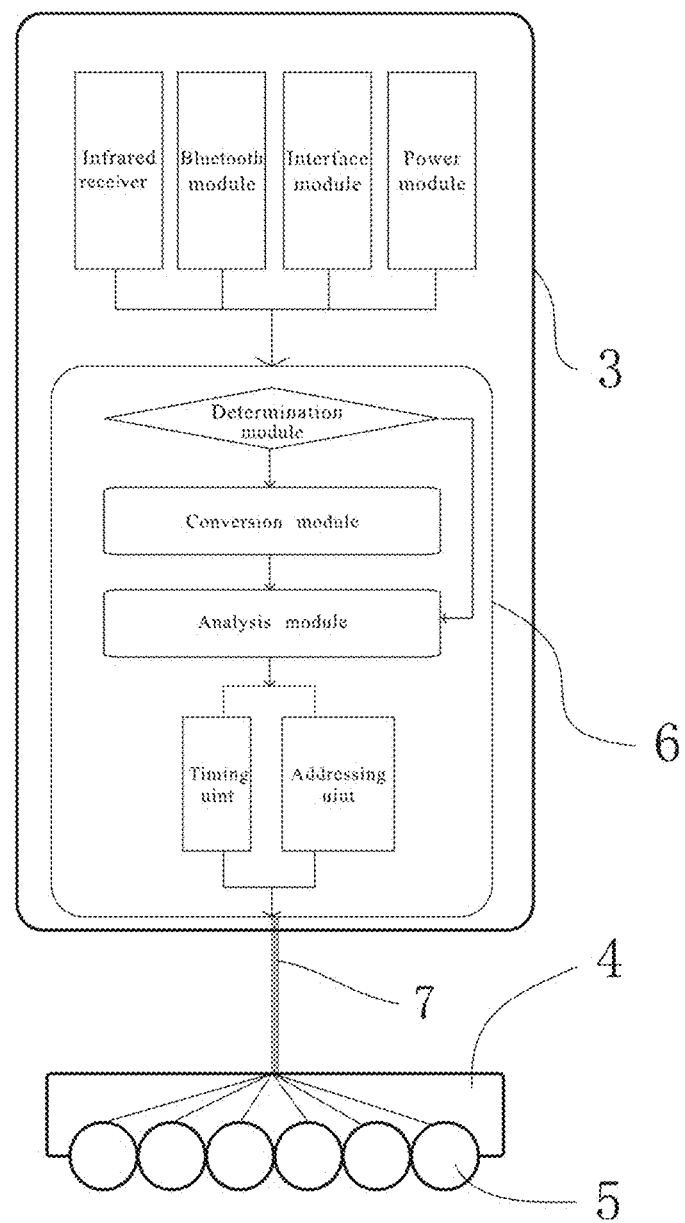
FIG. 51 is a diagram of a working principle of a fan display screen.

As shown in FIG. 50 and FIG. 51, an arc-shaped rod fan display screen is provided. The display screen is a display device based on the spherical imaging model in Embodiment 1, and includes a control mechanism 22-1 and a fan blade 22-4; the control mechanism 22-1 includes a control board 22-3 and a driving motor 22-2 with a driving end connected to the fan blade 22-4, and the fan blade 22-4 is a rod of an arc-shaped structure; there is one or more fan blades 22-4, the fan blades are driven by the driving motor 22-2 connected to the fan blades to rotate in a spherical shape during operation; and lamp beads 22-5 are arranged on an arc-shaped outer surface of one side of the fan blade 22-4 that faces audiences and are electrically connected to the control board 22-3, light emitted by the lamp beads 22-5 when energized is perpendicular to the arc surface, where the lamp beads are located, of the arc-shaped rod, an image processing module in the control board 22-3 parses an inputted video into image values of pixel coordinate values, color values, and grayscale values and transmits the image values to the lamp beads 22-5 on the corresponding positions of the fan blade 22-4, the lamp beads 22-5 receive the image values and then are lightened according to the image values, and picture display is implemented in combination with rotation of the fan blade.

Figure 52:
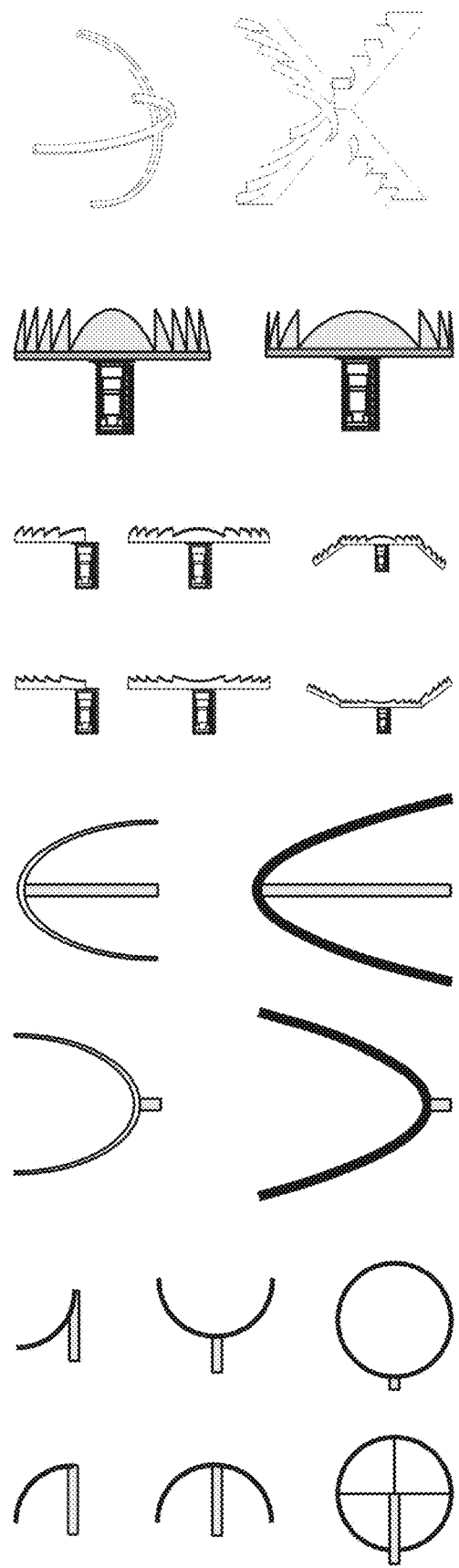
FIG. 52 is a schematic diagram of various shapes of a fan blade of a fan display screen.

A conventional spherical surface or a Fresnel spherical surface is formed based on the rotation of the fan blade 22-4 being the arc-shaped rod. The fan blade 22-4 is in the shape of a structural member with multiple corresponding shapes of spherical structural surfaces between two parallel planes obtained by intercepting the conventional spherical surface or the Fresnel spherical surface from the two parallel planes with a relatively small spacing as shown in FIG. 52.

Figure 53:
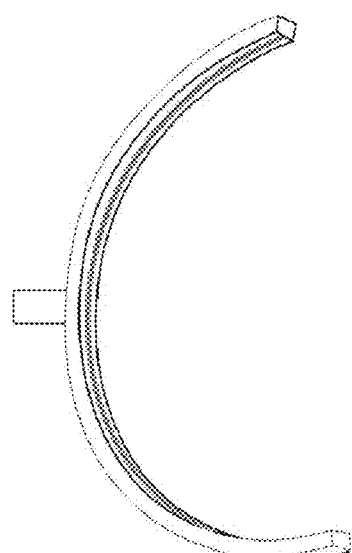
FIGS. 53 to 56 are schematic diagrams of distribution modes of lamp beads on a fan blade of a fan display screen.
Figure 54:
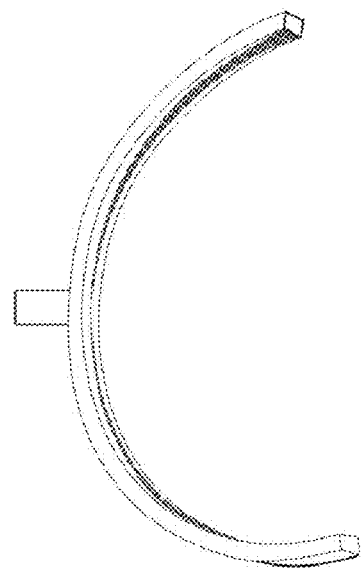
Figure 55:
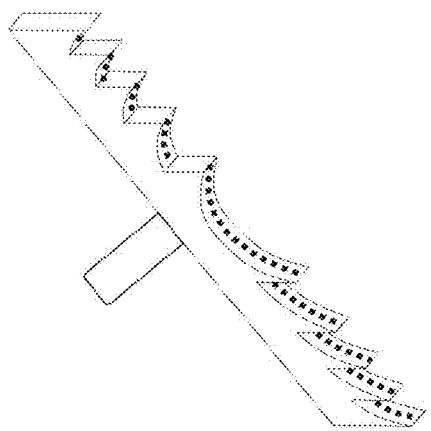
Figure 56:
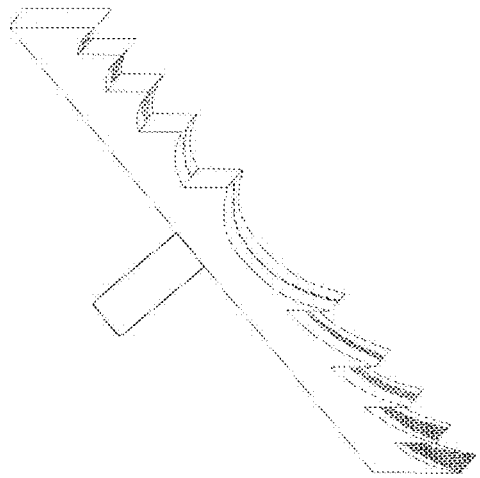

The lamp beads 22-5 are arranged on the surface of the fan blade 22-4 in a manner of arc lines as shown in FIGS. 53 and 55, the image processing module in the control board 22-3 transmits image signals to the lamp beads 22-5 by a matrixed scanning method in Embodiment 14, and the lamp beads are correspondingly lightened to present a picture; and the lamp beads 22-5 are arranged on the surface of the fan blade 22-4 in a fan-shaped manner as shown in FIGS. 54 and 56, the image processing module in the control board 22-3 transmits image signals to the lamp beads 22-5 by a matrix scanning method in Embodiment 13, and the lamp beads are correspondingly lightened to present a picture.

This embodiment is a variation of the display screen in Embodiment 21, which presents a stronger three-dimensional effect than the existing fan display screen, plays a wider range of image files, can directly play various spherical image video files or indirectly play planar image video files, has a wider range of application scenarios, and can be applied to visual flow guide of merchants and VR devices, which cannot be achieved by the existing fan display screen.

Figure 57:
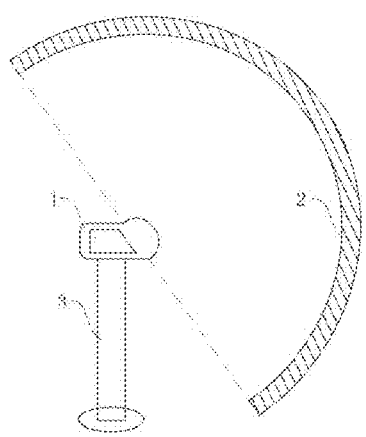
FIG. 57 is a schematic diagram of a projection apparatus according to Embodiment 23.
Figure 58:
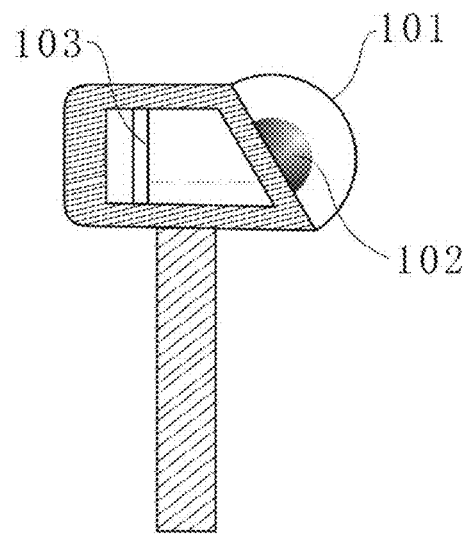
FIG. 58 is a schematic diagram of a static projection source of a projection host.

According to Embodiment 23, as shown in FIG. 57, a spherical image projection apparatus is provided. The projection apparatus is a display device based on the spherical imaging model in Embodiment 2, and includes a projection host 23-1, a projection display screen 23-2 with a spherical display surface, and a projection host bracket 23-3; the projection host 23-1 is a static projection source type host or a dynamic projection source type host; image signal particles emitted by the static projection source type host are spherical, image signal particles emitted by the dynamic projection source type host are arc line-shaped or point-shaped, and the arc line-shaped or point-shaped image signal particles form a spherical image signal particle surface through motion and are scanned and projected onto the spherical display surface of the projection display screen 23-2; as shown in FIG. 58, the static projection source type host includes a spherical light source 23-102, a spherical transparent projection screen 23-101 wrapped outside the spherical light source 23-102, and an image processing system 23-103; spherical centers of the spherical light source 23-102, the spherical transparent projection screen 23-1, and the projection display screen 23-2 are located on a same point; and during operation, the spherical light source 23-102 is lightened, a spherical image video played by the spherical transparent projection screen 23-1 is projected onto the spherical projection display screen 23-2, and incident angles between light of the image video and all parts of the display screen 23-2 are 90°, thereby presenting a picture.

Figure 59:
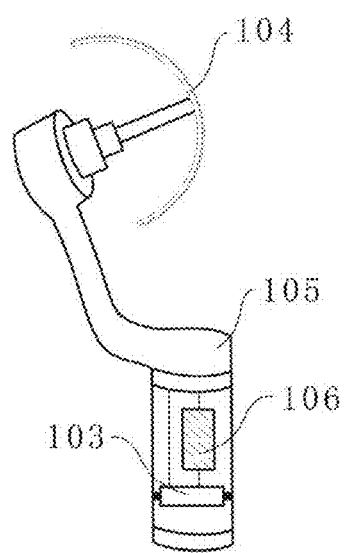
FIGS. 59 and 60 are schematic diagrams of a dynamic projection source of a projection host.
Figure 60:
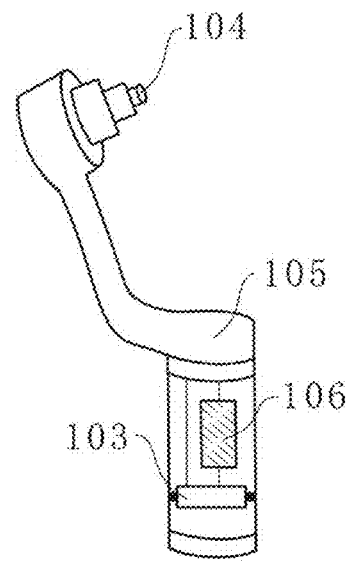

As shown in FIGS. 59 and 60, the dynamic projection source type host includes an image signal particle emission gun 23-104, an action apparatus 23-105, an action instruction system 23-106, and an image processing system 23-103, where the image signal particle emission gun 23-104 shown in FIG. 59 is an emission apparatus having multiple or multiple groups of emission holes and arranged in a direction, facing the projection display screen 23-2, of the fan blade being the arc-shaped rod in an arc line manner, the image signal particle emission gun 23-104 shown in FIG. 60 is an emission apparatus with a point-shaped emission source and one or one group of emission holes, when there is one emission hole, image particles emitted by the hole have a single primary color, and when there are multiple emission holes in one group, image particles emitted by the holes have multiple primary colors; the image signal particles emitted by the image signal particle emission gun 23-104 are visible light particles or non visible light particles; when the image signal particles are the non visible light particles, the particles generate visible light corresponding to image color values by exciting display units or display particles on the display surface of the projection display screen 23-2 to implement imaging; and during operation, the image processing system 23-103 sends a scanning action to the action instruction system 23-106 and sends color values of image pixels to the emission gun 23-104, the action apparatus 23-105 drives the emission gun 23-104 to move, the emission gun 23-104 emits the image signal particles corresponding to the image color values onto the spherical display surface of the projection display screen 23-2, and incident angles between the image signal particles and all parts of the display screen 23-2 are 90°, thereby presenting a picture.

The picture projected by the projection apparatus in this embodiment has higher definition, stronger three-dimensional effect, and can be seen with the naked eyes compared with that projected by an existing planar image projection apparatus, and the projection apparatus has a wider range of film sources than an existing spherical projection apparatus, making it easier to promote and popularize.

Figure 61:
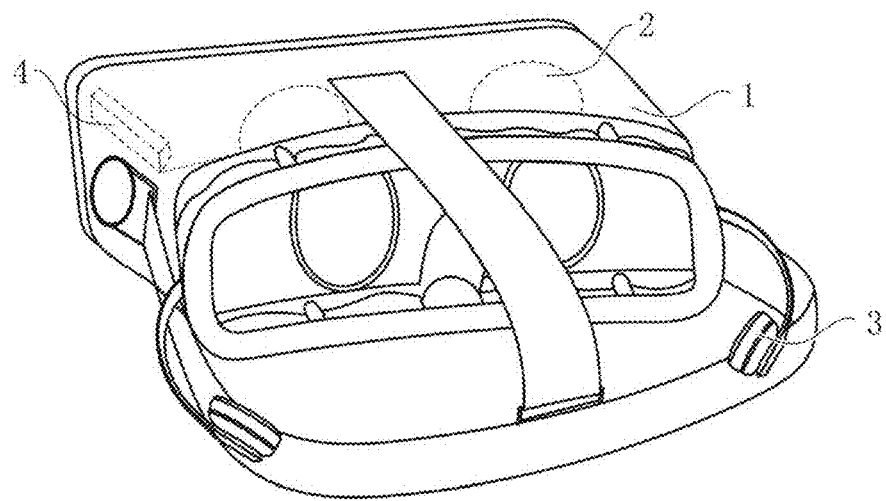
FIG. 61 is a schematic diagram of VR glasses according to Embodiment 24, in which 24-1 denotes a glasses frame, 24-2 denotes a spherical display screen, 24-3 denotes an earphone, and 24-4 denotes a file processing module.

According to Embodiment 24, as shown in FIG. 61, a glasses type panoramic display device is provided. The display device is also known as VR glasses and includes components such as a glasses frame 24-1, spherical display screens 24-2, earphones 24-3, a file processing module 24-4, and a control handle; one or two spherical display screens 24-2 are arranged in rims of the glasses frame 24-1 and located directly in front of the eyes of a spectator during wearing, and an image display surface of the spherical display screen is of a concave spherical structure or a convex spherical structure; and when there are two spherical display screens 24-2, the two display screens display a picture of a same view in a same region of a same picture of a panoramic image file shot and synthesized by a single view camera, or display two pictures of different views in a same region of a same picture of a panoramic image file shot and synthesized by a dual view camera respectively.

The spherical display screen 24-2 is the display screen of any one of the display devices in Embodiments 21, 22, and 23. The panoramic VR glasses using a display screen with a concave spherical display surface are configured to play a wide area source panoramic image file, the spectator rotates the head during watching, and a position change with the same rotation direction and the same rotation angle occurs in picture display; and the panoramic VR glasses using a display screen with a convex spherical display surface are configured to play a local area source panoramic image file, the spectator rotates the head during watching, a displayed picture does not have a position change, the spectator virtually moves the picture through the control handle, and the picture rotates in a corresponding movement direction.

Compared with existing VR glasses using a flat display screen, the VR glasses having spherical screens and using a spherical imaging model and method in this embodiment have the advantages that a displayed picture has a larger field of view, higher definition, smaller degree of deformation and blurring, and better picture quality. Moreover, the spherical screens do not need to be used with a convex lens like the flat display screen, such that the picture does not have the phenomena of granular sensation caused by pixels being magnified by the convex lens and difficulty in picture defocusing and focusing any more, a panoramic image outputted by a shooting device with a camera with a spherical image sensor for the spherical imaging model is played cooperatively, and the picture displayed by the VR device has higher quality and reaches a higher level. Therefore, the key defects and problems of low definition, narrow field of view, defocusing, and the like that hinder the development of existing VR glasses are fundamentally solved, and a significant role in promoting the development and popularization of VR and metaverse based on VR display technology is played.

According to Embodiment 25, pictures shown by an existing 3D cinema still have a relatively poor three-dimensional effect and a low level of immersion, and need to be watched by wearing dual color polarized glasses in most cases. However, wearing of the dual color polarized glasses for watching will significantly reduce the watching brightness of the pictures.

Figure 62:
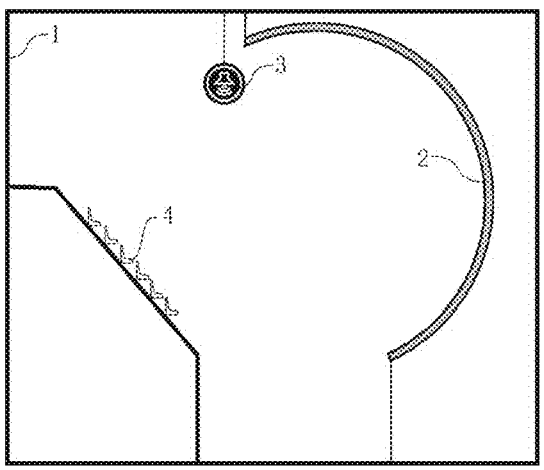
FIG. 62 is a schematic diagram of a panoramic cinema with a concave spherical display screen whose display surface is a relatively small part of a complete spherical surface.
Figure 63:
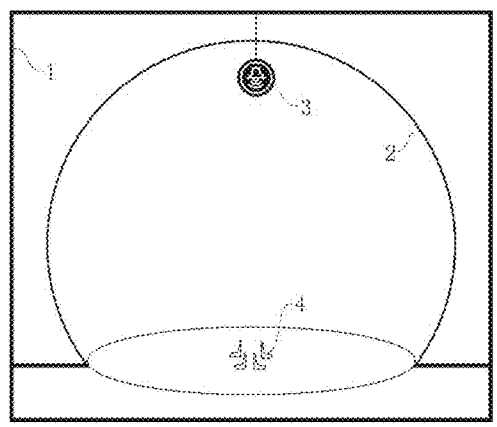
FIG. 63 is a schematic diagram of a panoramic cinema with a concave spherical display screen whose display surface is close to a complete spherical surface.

As shown in FIGS. 62 and 63, a cinema is provided, including a projection room 25-1, a concave spherical display screen 25-2 with a concave spherical display surface, a sound system 25-3, and a spectator stand 25-4.

When the display surface of the concave spherical display screen 25-2 is a relatively small part of a complete spherical surface, the concave spherical display screen 25-2 is arranged in one side of the projection room 25-1, the slope type spectator stand 25-4 is arranged in the other side of the projection room 25-1, a slope surface of the slope faces the display surface of the display screen 25-2, and an upper part and a lower part of an audience watching region on the slope surface are lower than and higher than the concave spherical display screen 25-2; and the cinema with this structure is configured to display and show a spherical image file and a wide area source panoramic image video file directly outputted by a camera with a spherical image sensor and a viewfinder lens 19-2 in a convex spherical shape.

When the display surface of the concave spherical display screen 25-2 is a complete spherical surface or other parts of the spherical surface are close to the complete spherical surface except a small part of spherical gap at an intersection with the ground of the projection room, the concave spherical display screen 25-2 is arranged in an upper space in a middle of the projection room 25-1 and is connected and fixed to an inner wall of the projection room 25-1 through a fixing frame, the display surface of the concave spherical display screen completely wraps the spectator stand 25-4 located in a middle region of the ground of the projection room 25-1, and audience seats on the spectator stand 25-4 can be rotated or moved to adjust a watching angle; and the cinema with this structure is configured to display a wide area source panoramic image file.

The picture presented by the cinema in this embodiment is a three-dimensional panoramic image that can be seen with the naked eyes, extends to an external space, and has a high feeling of depth and a wide area range.

Figure 64:
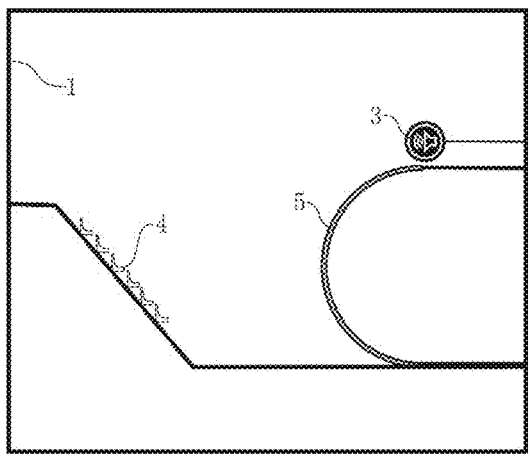
FIG. 64 is a schematic diagram of a panoramic cinema with a convex spherical display screen whose display surface is a relatively small part of a complete spherical surface.
Figure 65:
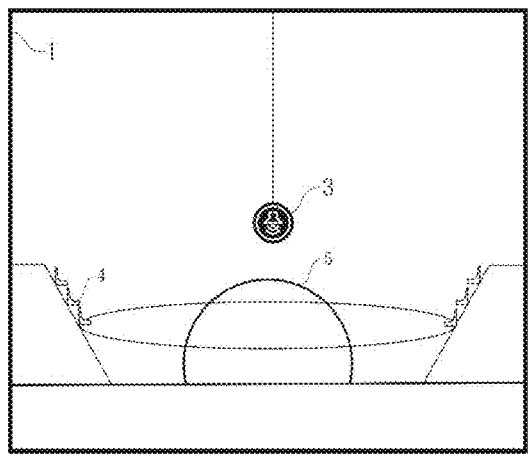
FIG. 65 is a schematic diagram of a panoramic cinema with a convex spherical display screen whose display surface is close to a complete spherical surface.

According to Embodiment 26, as shown in FIGS. 64 and 65, a cinema is provided, including a projection room 25-1, a convex spherical display screen 25-5 with a convex spherical display surface, a sound system 25-3, and a spectator stand 25-4.

When the display surface of the convex spherical display screen 25-5 is a relatively small part of a complete spherical surface, the convex spherical display screen is arranged in one side of the projection room 25-1, the slope type spectator stand 25-4 is arranged in the other side of the projection room 25-1, a slope surface of the slope faces the display surface of the convex spherical display screen 25-5, and an upper part and a lower part of an audience watching region on the slope surface are lower than and higher than the convex spherical display screen 25-5; and the cinema with this structure is configured to display a spherical image file and a local area source panoramic image file directly outputted by a camera with a spherical image sensor and a viewfinder lens 19-2 in a concave spherical shape.

When the display surface of the convex spherical display screen 25-5 is a complete spherical surface or other parts of the spherical surface are close to the complete spherical surface except a gap of the spherical surface in contact with the ground, the convex spherical display screen 25-5 is arranged on the ground at a lower part in a middle of the projection room 25-1, the slope type spectator stand 25-4 surrounds the convex spherical display screen 25-5, and the watching region on the slope surface is a region between a spherical center of the display surface of the convex spherical display screen 25-5 and a highest point of the display surface of the convex spherical display screen 25-5. The cinema with this structure is applicable to showing of a local area source panoramic image video.

The cinema in this embodiment presents a panoramic image that can be seen with the naked eyes, protrudes from one side or a center of the projection room 25-1 without external environmental scenes, and has a limited range and a high three-dimensional effect.

Figure 66:
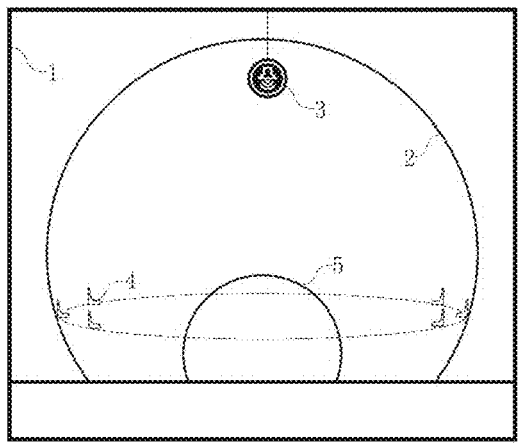
FIG. 66 is a schematic diagram of a panoramic cinema with convex and concave spherical display screens whose display surfaces are both close to a complete spherical surface.
Figure 67:
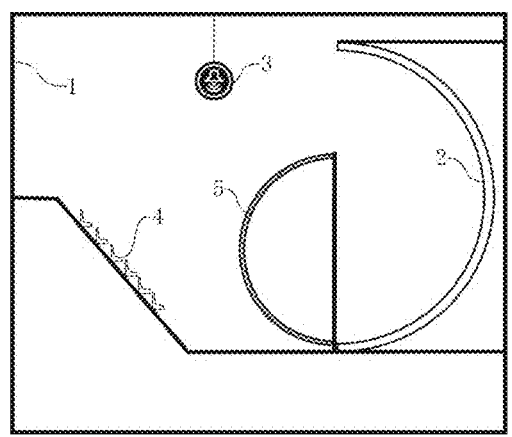
FIG. 67 is a schematic diagram of a panoramic cinema with convex and concave spherical display screens whose display surfaces are both a relatively small part of a complete spherical surface; and In FIGS. 62 to 67, 25-1 denotes a projection room, 25-2 denotes a concave spherical display screen with a concave spherical display surface, 25-3 denotes a sound system, 25-4 denotes a spectator stand, and 25-5 denotes a convex spherical display screen with a convex spherical display surface.

According to Embodiment 27, as shown in FIGS. 66 and 67, a cinema is provided, including a projection room 25-1, a concave spherical display screen 25-2 with a concave spherical display surface, a convex spherical display screen 25-5 with a convex spherical display surface, a sound system 25-3, and a spectator stand 25-4. A diameter of the display surface of the concave spherical display screen 25-2 is greater than a diameter of the display surface of the convex spherical display screen 25-5.

As shown in FIG. 66, when the display surface of the concave spherical display screen 25-2 and the convex spherical display screen 25-5 are complete spherical surfaces or other parts of the spherical surfaces are close to the complete spherical surfaces except a small part of spherical gaps at intersections with the ground of the projection room, the concave spherical display screen 25-2 is arranged in a position close to the upper space in the middle of the projection room 25-1 and is fixed to the inner wall of the projection room through the fixing frame; the convex spherical display screen 25-5 is arranged in a position close to the ground or on the ground at the lower part in the middle of the projection room 25-1 and is located in a position close to the lower part inside the concave spherical display screen 25-2 and completely wrapped by the display surface of the concave spherical display screen; and the spectator stand 25-4 is located between a horizontal plane passing through a spherical center of the display surface of the convex spherical display screen 25-5 and a horizontal plane passing through a spherical center of the display surface of the concave spherical display screen 25-2 and is close to an annular ring in a region on the display surface of the concave spherical display screen 25-2, and seats of the spectator stand 25-4 face the display surface of the convex spherical display screen 25-5.

As shown in FIG. 67, when the display surface of the concave spherical display screen 25-2 and the display surface of the convex spherical display screen 25-5 are a relatively small part of a complete spherical surface, the concave spherical display screen 25-2 and the convex spherical display screen 25-5 are arranged in a same side of the projection room, and the platform or slope type spectator stand is located in the other side of the projection room.

The cinema in this embodiment allows the audiences to watch not only pictures covering all peripheral wide area environments and having high depth and strong three-dimensional effect, but also local pictures of virtual three-dimensional characters and scenes that protrude in front of the audiences and are in the wide area pictures together with the audiences. In this way, the audiences and the virtual humans and objects are in a same virtual world, thereby achieving mixed reality visual experience of a higher level of immersion.

The concave spherical display screen 25-2 and the convex spherical display screen 25-5 in Embodiments 25-27 are the self-luminous display screens in Embodiment 22, the projection apparatuses in Embodiment 24, or fan display screens in Embodiment 23. Due to the difficulty in implementing large-sized display on the fan display screen, the fan display screen can only be used in a miniature panoramic cinema.

The implementations of the present disclosure are described above with reference to the accompanying drawings and the embodiments. The structures provided in the embodiments do not constitute limitations to the present disclosure. Those skilled in the art may make adjustments as needed, and various transformations or modifications made within the scope of the appended claims are all within the scope of protection.

What is claimed is:

1. An imaging apparatus, comprising an imaging element with an imaging surface of a spherical structure, wherein angles between all parts of the spherical imaging surface and light emitted by an image source at an intersection of the imaging surface are 90°, and a plurality of imaging units are distributed on the imaging surface,
   wherein the imaging units are arranged on the imaging surface, and satisfy at least one of the following conditions:
   a) arranged in a manner of spiral lines, a spacing between every two of the imaging units on a same spiral line is equal and is equal to a spacing between adjacent two of the spiral lines, and when there are a plurality of spiral lines on the imaging surface on which the imaging units are arranged in a manner of the spiral lines, a spacing between every two of the plurality of spiral lines is equal and is equal to the spacing between every two of the imaging units; the spacing herein refers to a spacing along the imaging surface;
   b) distributed on the imaging surface in an equally spaced manner without using any point, line, or surface as a reference object; and
   the imaging units refer to photosensitive units on a photosensitive surface of a camera image sensor, display pixels of a display screen, or image pixels of an image.

2. The imaging apparatus according to claim 1, further comprising an image source of a spherical structure, wherein during imaging, light emitted by the image source is irradiated onto the imaging surface of the imaging element, and the image source adjusts a direction and an angle of incident light, such that all the light finally irradiated onto the imaging surface is perpendicular to corresponding positions of all the parts of the imaging surface.

3. The imaging apparatus according to claim 2, further comprising an optical lens combination and an auxiliary lens, wherein the optical lens combination and the auxiliary lens are located on a path of the light, a direction and the path of the light emitted by the image source are changed by changing attributes and layout of the optical lens combination, and a distance and a position of the light arriving at the imaging surface are changed correspondingly, such that the imaging surface is capable of being placed in a specified position as needed; and the auxiliary lens further precisely adjusts the incident light on the imaging surface, such that the incident light irradiated onto all the parts of the imaging surface is precisely perpendicular to the corresponding positions of all the parts of the imaging surface.

4. The imaging apparatus according to claim 3, wherein the auxiliary lens coincides with a symmetric axis of the imaging surface, and the imaging surface, the image source, and the auxiliary lens have the same type of spherical structure or are matched with one another.

5. The imaging apparatus according to claim 1, wherein the spherical structure of the imaging surface is a concave spherical surface or a convex spherical surface.

6. The imaging apparatus according to claim 1, wherein the spherical structure of the imaging surface is a conventional spherical structure, a Fresnel spherical structure, or a combined structure of a plurality of Fresnel spherical structures; wherein the conventional spherical structure is one of a conventional regular spherical structure, a conventional ellipsoidal structure, and a conventional paraboloidal structure; and the Fresnel spherical structure is one of a Fresnel regular spherical structure, a Fresnel ellipsoidal structure, and a Fresnel paraboloidal structure.

7. An imaging method based on the imaging apparatus according to claim 1, comprising:
   S1: setting angles between all parts of the spherical imaging surface and light emitted by the image source at the intersection of the imaging surface to 90°;
   S2: performing matrixing on imaging units on the imaging surface to form a virtual row and column matrix, and performing image pixel value reading or writing on the virtual row and column matrix; and
   S3: directly receiving, by an image obtaining device for a convex spherical imaging surface, a virtual matrix formed by an external world scene, indirectly receiving, by a concave or convex spherical imaging surface, an image file corresponding to the virtual matrix and formed and outputted by the external world scene through a convex spherical image source, and performing restoration display by using a display device whose watching surface is a concave spherical display surface; and directly receiving, by a concave spherical imaging surface, the virtual matrix formed by the external world scene, indirectly receiving, by the concave or convex spherical imaging surface, the image file corresponding to the virtual matrix and formed and outputted by the external world scene through a concave spherical image source, and performing restoration display by using a display device whose watching surface is a convex spherical display surface.

8. The imaging method according to claim 7, wherein a method for reading the imaging units in S2 is as follows:

S2.1: a method for supplementing actual imaging units on latitude lines/transverse lines with virtual imaging units, in which the imaging units distributed on the imaging surface in a manner of the latitude lines/transverse lines are used as the actual imaging units, a number of the actual imaging units on a longest latitude line/transverse line is used as a reference number, the imaging units whose number is less than the reference number on other latitude lines/transverse lines are supplemented with the virtual imaging units in order to make a sum of the actual imaging units and the supplemented virtual imaging units on other latitude lines/transverse lines reach the reference number, and the latitude line/transverse line for the same number of imaging units whose number reaches the reference number is used as a row; and the rows obtained by the above method are used as rows, and a number of the latitude lines/transverse lines for all the imaging units on the imaging surface is used as a number of columns, to form the virtual row and column matrix; S2.2: a method for mutually supplementing imaging units on adjacent latitude lines/transverse lines, in which the imaging units distributed on the imaging surface in a manner of the latitude lines/transverse lines are used as actual imaging units, a given number of the actual imaging units is used as a reference value, one of the latitude lines/transverse lines is used as a starting line, the actual imaging units are virtually picked line by line and point by point, if a number of the actual imaging units virtually picked from the starting latitude line/transverse line reaches the reference value, the starting latitude line/transverse line serves as a virtual row and recorded as a first row, or if the reference value is not reached, the imaging units continue being virtually picked from an adjacent next latitude line/transverse line, and the adjacent next latitude line/transverse line serves as a virtual row and recorded as a first row until the reference value is reached; virtual picking of the remaining actual imaging units from the latitude line/transverse line is included in virtual picking from a next virtual row; by analogy, until the actual imaging units on the last latitude line/transverse line of the imaging surface are all virtually picked, and when a number of the actual imaging units virtually picked at last time does not reach the reference value, virtual imaging units are used for supplementation; and finally, the rows obtained by the above method are used as rows, and a total number of the rows is used as a number of columns, to form the virtual row and column matrix; S2.3: a block method, in which the imaging surface on which the imaging units are distributed in an equally spaced manner by means of longitude lines, latitude lines, transverse lines, spiral lines, or no reference object is divided into one or more equal-area or unequal-area blocks based on a principle that a number of the imaging units in each of the blocks is equal and is equal to a reference value, and when the number of the imaging units in the block of the imaging surface is less than the reference value, virtual imaging units are used for supplementation until the reference value is reached, and the equal number of the imaging units in the block are regarded as a virtual row; and the rows obtained by the above method are used as rows, and a number of all the blocks is used as a number of columns, to form the virtual row and column matrix;

S2.4: a virtual longitude line cutting method, in which any longitude line on the imaging surface that passes through a central point of a spherical structure is used as a virtual longitude line, the virtual longitude line rotates clockwise or counterclockwise with a diameter line perpendicular to a spherical surface and passing through a central point of the spherical surface as a rotation axis, and the virtual longitude line in a preset time period is cut into an equal number of imaging units distributed on the imaging surface in an equally spaced manner by means of latitude lines, transverse lines, spiral lines, or no reference object to serve as a virtual row; and the rows obtained by the above method are used as rows, and a number of virtual rows obtained by rotating the virtual longitude line by one circle is used as a number of columns, to form the virtual row and column matrix; S2.5: a longitude line method, in which each longitude line for an equal number of imaging units on the imaging surface on which the imaging units are distributed in a manner of longitude lines is used as a row, and a number of all longitude lines is used as a column of columns, to form the virtual row and column matrix; S2.6: a spiral line layout method, in which the imaging units are divided into a plurality of parts with an equal number of imaging units, and the number of imaging units are selected from a first imaging unit at a starting point of a spiral line to serve as a virtual row, until the last imaging unit on the spiral line is selected; and the equal number of imaging units selected are used as the virtual row, and a number of all virtual rows is used as a column of virtual columns, to form the virtual row and column matrix; or S2.7: a point interval sampling method, in which the imaging units are subjected to point interval sampling after the virtual row and column matrix is obtained in S2, an odd number of groups form a matrix, an even number of groups form a matrix, and the two matrices receive different view image matrix data of a same picture in a matched way respectively for displaying a dual view image video.

9. The imaging method based on an imaging apparatus according to claim 7, wherein in S3.1, an image data set file in an original matrix form is output, or in S3.2, pixel coordinates and pixels in the virtual row and column matrix are subjected to spherical surface restoration and then stitched to output a spherical image file.

10. An image sensor, comprising the imaging apparatus according to claim 1, wherein the imaging element in the imaging apparatus is embodied as a photosensitive element in the image sensor, the imaging surface is embodied as a photosensitive surface, and imaging units on the imaging surface are embodied as photosensitive units;

wherein, the image sensor further comprises a matrix generator connected to the imaging element, a data reader connected to the matrix generator, and an image processor connected to the data reader;

wherein, when the image sensor works, the imaging method is executed, the matrix generator processes the photosensitive units arranged in a non-matrix manner on the imaging surface of the imaging element through a logic circuit built in the matrix generator to generate a virtual matrix arranged in a matrix manner, photosensitive data obtained by the photosensitive units on the virtual matrix from outside is read by the data reader and then transmitted to the image processor, and the image processor processes the input data and outputs a corresponding image file.

11. The image sensor according to claim 10, wherein the image sensor is separately encapsulated or encapsulated together with an auxiliary lens; and when the image sensor and the auxiliary lens are encapsulated together, the auxiliary lens has one side facing a photosensitive hole and the other side facing away from the photosensitive hole and facing the imaging surface of the imaging element of the image sensor, and a focal point of the auxiliary lens coincides with a spherical center of the spherical imaging surface.

12. The imaging apparatus according to claim 2, wherein the spherical structure of image source is a concave spherical surface or a convex spherical surface.

13. The imaging apparatus according to claim 3, wherein the auxiliary lens is of a structure with a flat surface and a spherical surface, or a structure with two spherical surfaces; and the spherical surface refers to is a concave spherical surface or a convex spherical surface.

14. The imaging apparatus according to claim 2, wherein the spherical structure of the image source is a common spherical structure, a Fresnel spherical structure, or a combined structure of a plurality of Fresnel spherical structures; wherein the conventional spherical structure is one of a conventional regular spherical structure, a conventional ellipsoidal structure, and a conventional paraboloidal structure; and the Fresnel spherical structure is one of a Fresnel regular spherical structure, a Fresnel ellipsoidal structure, and a Fresnel paraboloidal structure.

15. The imaging apparatus according to claim 3, wherein the spherical structure of the auxiliary lens is a common spherical structure, a Fresnel spherical structure, or a combined structure of a plurality of Fresnel spherical structures; wherein the conventional spherical structure is one of a conventional regular spherical structure, a conventional ellipsoidal structure, and a conventional paraboloidal structure; and the Fresnel spherical structure is one of a Fresnel regular spherical structure, a Fresnel ellipsoidal structure, and a Fresnel paraboloidal structure.

* * * * *